US010558962B2

(12) United States Patent
Szeto

(10) Patent No.: US 10,558,962 B2
(45) Date of Patent: Feb. 11, 2020

(54) PROCESSING OF UNIT-BASED TRANSACTIONS

(71) Applicant: Amy Szeto, Boston, MA (US)

(72) Inventor: Amy Szeto, Boston, MA (US)

( * ) Notice: Subject to any disclaimer, the term of this patent is extended or adjusted under 35 U.S.C. 154(b) by 99 days.

(21) Appl. No.: 15/566,578

(22) PCT Filed: Apr. 14, 2016

(86) PCT No.: PCT/US2016/027591
§ 371 (c)(1),
(2) Date: Oct. 13, 2017

(87) PCT Pub. No.: WO2016/168499
PCT Pub. Date: Oct. 20, 2016

(65) Prior Publication Data
US 2018/0096326 A1    Apr. 5, 2018

Related U.S. Application Data

(60) Provisional application No. 62/147,561, filed on Apr. 14, 2015, provisional application No. 62/173,928, filed on Jun. 10, 2015.

(51) Int. Cl.
*G06Q 30/06* (2012.01)
*G06Q 20/20* (2012.01)
*G06Q 20/38* (2012.01)
*G06Q 20/40* (2012.01)
*G06Q 30/02* (2012.01)
*G06Q 50/06* (2012.01)

(52) U.S. Cl.
CPC ........... *G06Q 20/20* (2013.01); *G06Q 20/382* (2013.01); *G06Q 20/40* (2013.01); *G06Q 30/0201* (2013.01); *G06Q 30/06* (2013.01); *G06Q 50/06* (2013.01)

(58) Field of Classification Search
CPC ...................................... G06Q 30/06
USPC ............................................ 705/18
See application file for complete search history.

(56) References Cited

U.S. PATENT DOCUMENTS

| 2004/0103003 | A1* | 5/2004 | Mayers | G06Q 40/08 |
| | | | | 705/4 |
| 2008/0195432 | A1* | 8/2008 | Fell | G06Q 10/063 |
| | | | | 705/4 |
| 2009/0152343 | A1* | 6/2009 | Carter | G06Q 10/0633 |
| | | | | 235/379 |
| 2013/0124347 | A1* | 5/2013 | Hwang | G06Q 30/02 |
| | | | | 705/16 |

(Continued)

*Primary Examiner* — Russell S Glass
(74) *Attorney, Agent, or Firm* — Sterne, Kessler, Goldstein & Fox P.L.L.C.

(57) ABSTRACT

Fuel hedging is used by large corporations to reduce exposure to fuel price volatility. But individual consumers are not afforded the same opportunities. In an embodiment, a payment card is provided that stores units of purchased products, and allows a user to purchase future units of the product before redeeming the products (such as oil). In an embodiment, a user can purchase the payment card with purchased units at a kiosk at a gas station. A backend processor receives the purchase request and buys select derivatives on the market to match the purchase request. Upon authenticating the user, the backend processor sends an authorization message back to the kiosk that dispenses the payment card.

8 Claims, 7 Drawing Sheets

(56) References Cited

U.S. PATENT DOCUMENTS

2014/0244413 A1\* 8/2014 Senior .................. G06Q 20/203
705/20

\* cited by examiner

PROCESSING OF UNIT-BASED TRANSACTIONS

FIELD

This disclosure is generally directed to a system for processing unit-based transactions of products or services.

BACKGROUND

Historically, many commodities, including fossil fuels like crude oils and refined products, have had volatile prices. Large fuel-consuming companies such as airlines or trucking companies may need to regularly purchase large amounts of fuel to operate. Therefore, these companies are particularly vulnerable to fuel price volatility of, for example, crude oils. To reduce exposure to volatile and potentially rising fuel costs, these companies engage in various fuel hedging strategies. These strategies may include trading options over-the-counter (OTC) or through an exchange.

Like large fuel-consuming companies, individual consumers of commodities including oil have also been adversely affected by volatile oil prices. Thus, individual consumers have also long sought strategies and technologies to reduce their exposure to increasing oil prices. But unlike these companies, individuals are much more limited in their fuel risk-management strategies. For example, when the market price of oil is low, the consumer may wish to purchase additional oil to hedge against future increases in oil price. But even if a consumer (or user) wishes to purchase more oil from a merchant, such as a gas station, the consumer is limited to the amount of gasoline that his automobile's fuel tank can hold. Some consumers may own spare containers to store additional oil. But these containers, too, are limited in capacity and further requires a means to store these spare containers. Additionally, stored fuel is a fire hazard and degrades over time, which further reduces value of storage.

Other consumers may try to mitigate fuel volatility by purchasing stocks or other financial instruments with performance that generally tracks the price of oil. For example, if the price of oil increases, these stocks are likely to have increased value. Thus, the consumers may use the gains from these higher-value stocks to offset the price that these consumers may need to pay for gasoline at a gas station. If the price of oil decreases, though these stocks may have lower value, consumers would pay less for gasoline as the gas station. This strategy, however, is inefficient because the values of stocks or other financial instruments do not necessarily track (or track in real time) the actual price of commodities like oil for which consumers ultimately pay. Additionally, this strategy requires the consumers to concurrently manage both their financial assets and fuel-consumption behavior. For example, the consumers may utilize a web application to manage his fuel-stock portfolio to determine when to purchase or sell his financial assets. The consumer may also need to utilize a separate application to manage how much gasoline to purchase (given his tank's limited storage) to correspond to his fuel-stock portfolio.

BRIEF SUMMARY

What is needed are system, method, article of manufacture, and/or computer product embodiments, and/or combinations and sub-combinations thereof, to couple fuel-hedging capabilities directly with the purchasing of commodities including fuels at a point of sale for individual consumers. To provide this coupling, embodiments describe means for authenticating, encrypting, processing, and storing electronic payments in terms of unit-based transactions. By implementing technology to process unit-based transactions and associated requests, service providers may enable consumers to purchase commodities like oil from a merchant, for example, the gas station, based on the amount of units desired independent of a market or current price of oil. But current transaction gateways and servers can only operate on monetary-based transactions and not unit-based transactions. To process unit-based transactions securely and in real time, embodiments further describe systems and methods for authenticating unit-based transactions and effectively processing user requests associated with these unit-based transactions.

In an embodiment, a system includes a data store that stores a user account associated with a stored-unit payment instrument issued to a user, the user account storing a representation of a first amount of a product. A monitoring component of the system queries a financial exchange, via an exchange communication network, for a plurality of financial instruments that relate to the product. Then, the monitoring component stores, in the data store, one or more financial instruments purchased from the queried plurality of financial instruments. An authorization component receives, from a point-of-sale (POS) terminal in a merchant system, via a communication network, a request that specifies a second amount of the product to be redeemed by the user in real time with the merchant system, and sends a message to the POS terminal, via the communication network, to approve the redeem request upon verifying that the first amount of the product exceeds or meets the requested second amount, wherein the sent approval message causes the merchant system to dispense to the user the requested second amount of the product. Based on the redeem request, an exchange component places an order generated from one of the purchased one or more financial instruments, wherein the order is placed on the financial exchange via the exchange communication network.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present disclosure and, together with the description, further serve to explain the principles of the disclosure and to enable one of ordinary skill in the art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
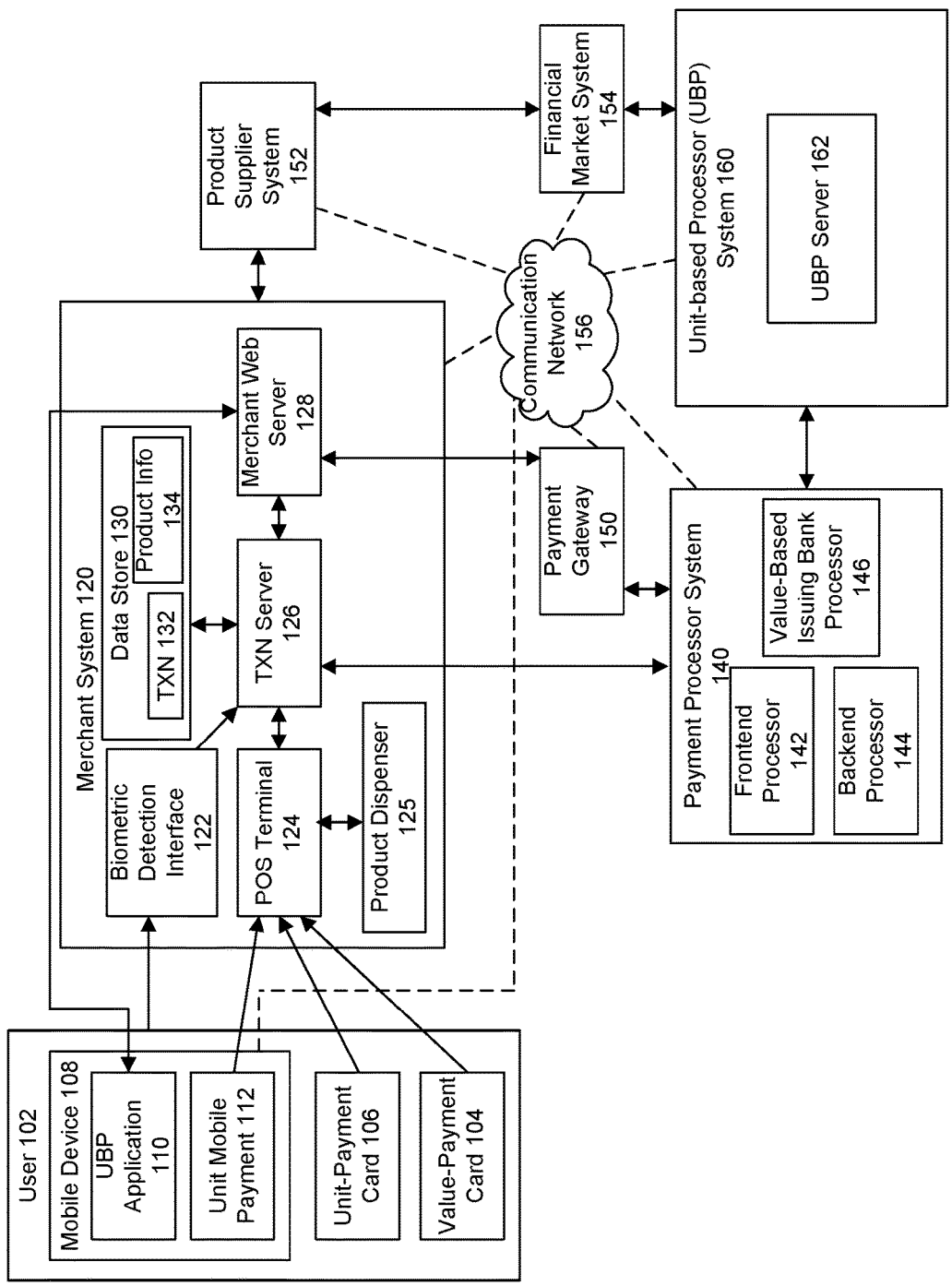
FIG. 1 is a block diagram of a system for providing real-time, point-of-sale authorization of unit-based transactions, according to an embodiment.
Figure 2:
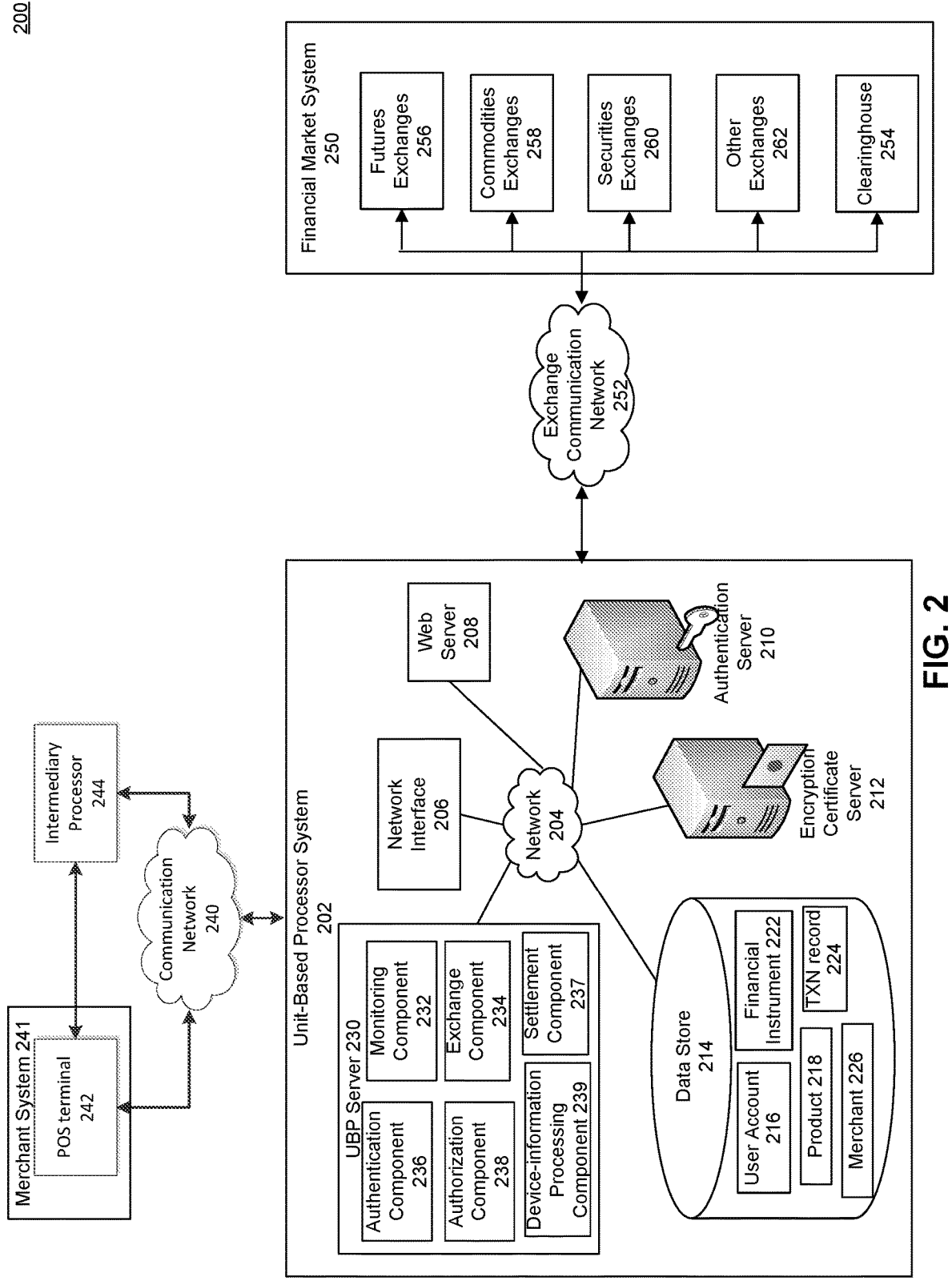
FIG. 2 is a block diagram of a unit-based processor system interacting with other systems, according to an example embodiment.

FIGS. 1-2 generally describe the technology implemented by various systems to securely process unit-based transactions in real time at a point of sale at a merchant. Particularly, FIG. 1 illustrates a system 100 for providing real-time, point-of-sale processing of unit-based transactions, according to an embodiment. System 100 includes user 102, merchant system 120, payment gateway 150, payment processor system 140, unit-based processor (UBP) system 160, financial market system 154, and product supplier system 152. In an embodiment, each of the systems and mobile device 108 may communicate with each other via communication network 156. Communication network 156 may be a local area network (LAN), metropolitan area network (MAN), wide area network (WAN), or a combination thereof. It may utilize any point-to-point or multipoint-to-multipoint networking protocols. These networking protocols may include, for example, one or more of Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), or Multiprotocol Label Switching (MPLS).

In some embodiments, system 100 operates as follows. UBP system 160 may manage a stored-unit payment instrument (e.g., unit-payment card 106) issued to and purchased by user 102. In an embodiment, user 102 may use the stored-unit payment instrument to redeem a retail-version of an amount of a product provided or sold by merchant system 120. Merchant system 120 may supply the retail-version product based on a wholesale version of the product purchased from product supplier system 152. Product supplier system 152 may sell units or derivatives of the product to merchant system 120 or financial market system 154. To process requests by user 102, merchant system 120 generates and forwards unit-based transactions to payment processor system 140. Payment processor system 140 may communicate with value-based issuing bank processor 146 to verify value-based transactions. Payment processor system 140 may route unit-based transactions to UBP system 160 to process and authorize the unit-based transactions. As part of processing, UBP system 160 may exchange (e.g., purchase or sell) units of products or derivatives thereof on financial market system 154. Further, UBP system 160 generates and sends an authorization result back to merchant system 120. In some embodiments, UBP system 160 generates and sends the authorization after exchanging units of products or derivatives. Responsive to receiving the authorization result, merchant system 120 may allow user 102 to redeem the requested amount of unit of the product.

For clarity and simplicity, embodiments may be described with respect to purchasing a redeemable unit of gasoline or redeeming that purchased unit of gasoline, an example product, from a gas station. When the product is, for example, gasoline, merchant system 120 may be a gas station (or a fueling station) and product supplier system 152 may be a gasoline supplier or an oil refinery company. Though embodiments may be described with respect to gasoline, embodiments may similarly apply to other types of products sold or provided by merchant system 120. For example, products may include different fuels such as butane, heating oil, diesel, compressed natural gas, ethanol fuel, biofuel, kerosene, hydrogen, electricity, varying octane grade of gasoline, and so forth. Products may include foods such as milk, produce (e.g. oranges, apples, bananas, pineapples, etc.), grains (e.g. corn, soybean, wheat, rice, etc.), meats (e.g. beef, pork, poultry, fish, sea foods, etc.), and so forth. Products may include commodities such as minerals, raw materials, and metals (e.g. gold, silver, copper, steel, etc.) Products may also include service-based products such as utility, which some people consider a service. In a sense, certain aspects of the utility may be like a service and other aspects may be like a product. In the case of electricity, the user may purchase additional electricity when energy product is at a lower rate. For communities receiving less expensive wind power, this may be the case in the winter months when the wind is stronger.

Service-based products may include, for example, electricity, water, telecommunication bandwidth, television service, sewer/garbage pickup, transportation costs, delivery costs, etc. In the example of an automobile motor oil change, an example service-based product, automobile service stations business and associated service price fluctuates. For some people, the service by a particular service station is not as important as the service taking place (e.g. people would use a different service station if the price is lower). Thus, users may be able to pre-purchase service at a time when service stations across the industry advertise sales during slow months. Products, as described herein, may refer only to consumer products. Consumer products are typically understood to refer to merchandise or other goods bought by individuals or households for private consumption. In this document herein, products may refer to both goods and services bought by individuals or households for private consumption.

Likewise, while embodiments may be described with respect to gallons of gasoline, the units of the product may be dependent on the type of product provided. For example, units may include quantity, size, volume, mass, time, velocity, acceleration, temperature, power, force, energy, work, pressure, viscosity, field strength, flux, flux density, charge, capacitance, inductance, impressions (e.g., for advertisement), bytes, bandwidth, and so forth. By implementing hardware and software, described in this document herein, for processing unit-based transactions efficiently, system 100 effectively enables individual users, such as user 102, to hedge against price fluctuations of products provided by merchant system 120 in real time at a point of sale.

To interact with merchant system 120, user 102 may have a stored-unit payment instrument and a stored-value financial instrument. A stored-value financial instrument may be a traditional credit (or debit) card such as value payment card 104 for purchasing products without cash. In contrast, a stored-unit payment instrument may be a unit-payment card 106 or unit mobile payment 112 within mobile device 108. While the stored-value financial instrument may store or be associated with currency, the stored-unit payment instrument may be associated with stored units (or amounts) of one or more products and, in some embodiments, qualitative features of the one or more products. Continuing the gas station example, the stored-unit payment instrument may be associated with, for example, stored gallons or liters of premium grade gasoline (octane 92).

Unit-payment card 106 may be a physical plastic card issued by UBP system 160. In some embodiments, unit-payment card 106 may be issued by a third party, such as value-bank issuing bank processor 146, and modified or processed by UBP system 160. To enable secure processing of unit-based transactions, unit-payment card 106 may store data identifying user 102. To increase security and prevent fraud, unit-payment card 106 may store the user data by implementing one or more of magnetic-strip technology, secure chip (e.g., EMV) technology, radio-frequency identification (RFID) tags, bar codes, etc.

Unit mobile payment 112 may be implemented by mobile device 108 using associated hardware, operating system, software application, or a combination thereof to enable user 102 to use mobile device 108 as a substitute, an additive, or a proxy for unit-payment card 106. Mobile device 108 may be a portable computing device capable of connecting to a wireless network, such as communication network 156. Portable computing devices may include a smartphone, a tablet, a laptop, a smart watch, smart glasses, and so forth. In some embodiments, unit mobile payment 112 may store similar user account information or associated identification information as that stored by unit-payment card 106. Therefore, mobile device 108 may act as a substitute for unit-payment card 106 because, in some embodiments, upon authenticating user 102 of mobile device 108, mobile device 108 may similarly send to merchant system 120 information of unit mobile payment 112, which may correspond to information of unit-payment card 106. Mobile device 108 may send information of unit mobile payment 112 without contact via a proximate communication technology. The proximate communication technology may include near field communication (NFC), radio-frequency identification (RFID), or Bluetooth, and so forth.

Additionally, user 102 may access a UBP application 110 using mobile device 108 or other computing devices such as desktop computers to purchase redeemable units of a product or to redeem one or more of those purchased units. UBP application 110 may communicate with merchant system 120 or UBP system 160 via communication network 156. In some embodiments, instead of accessing UBP application 110, user 102 may use mobile device 108 to access a web portal provided by merchant system 120 or UBP system 160. In either case, in some embodiments, user 102 may use mobile device 108 to purchase or refill redeemable units of a product via communication network 156, such as the Internet, without being in proximity of merchant system 120. In some embodiments, user 102 may purchase or refill redeemable units by placing a telephone call using mobile device 108 (or a landline) to UBP system 160.

To couple hedging capabilities directly with the products provided, merchant system 120 may need to be capable of processing unit-based transactions. To process unit-based transactions securely and in real time at the point of sale, merchant system 120 may include point-of-sale (POS) terminal 124, product dispenser 125, biometric detection interface 122, data store 130, transaction (TXN) server 126, and merchant web server 128. Continuing the gas station example, product dispenser 125 may be a gasoline pump coupled to a POS terminal 124 at a gas station kiosk. Biometric detection interface 122 may include a biometric sensor such as a fingerprint reader or a video camera that may be coupled to or within the gas station kiosk. In some embodiments, biometric detection interface 122 may use the sensors (e.g. fingerprint read, microphone, video camera, etc.) of mobile device 108 and download data acquired from these sensors. Additionally, biometric detection interface 122 may download biometric data resident on mobile device 108 without accessing the sensors of mobile device 108.

POS terminal 124 may be a device that provides to user 102, within a graphical user interface or a mechanical key-based interface or both, various options to purchase units of a product, such as gasoline, that is redeemable anytime in the future. In some embodiments, the option may expire at a predetermined future date or time. In some embodiments, instead of purchasing an option, user 102 may purchase an amount of redeemable units that do not expire. The purchased redeemable units and purchased units in the option may be redeemable at merchant system 120, such as a gas station, or at other merchant systems, such as other gas stations. These merchant systems may be managed by different entities in different locations such as in different cities, states, or countries.

For example, user 102 may use value-payment card 104 (or cash) to purchase unit-payment card 106 storing redeemable amount of a product. POS terminal 124 may include a physical terminal for reading card information from any payment card (e.g., value-payment card 104 or unit-payment card 106) using magnetic strip technology or secure chip (e.g., EMV) technology. For example, magnetic strip technology may be implemented within the payment card to store data by modifying the magnetism of tiny iron-based magnetic particles on a band of magnetic material on the payment card.

The magnetic strip may contain, encoded on the magnetic material, one or more of the following information: payment processor system 140 identifier, payment processor 140 contact information, name of user 102, account number of user 102, expiration date of the payment card, service code, discretionary data such as a personal identification number (PIN) verification key, PIN verification value, or card verification code, longitudinal redundancy check, a public key, an encrypted message, and so forth. Other types of technologies such as EMV technology or unit-mobile payment 112 may store similar types of card information. One or more of this encoded information may be encrypted on the magnetic material (or within mobile device 108 in the case of unit mobile payment 112).

As an illustrative example, when value-payment card 104 is swiped at POS terminal 124 at merchant system 120 to purchase, for example, an amount of redeemable gasoline for $15, POS terminal 124 reads the information from, for example, the payment card's magnetic strip. POS terminal 124 then determines the proper third party company, which may include payment processor 140, to process the payment transaction, and submit one or more elements encoded on the payment card to payment processor 140 via TXN server 126. TXN server 126 may use the request of user 102 (including a number of redeemable gallons of gasoline desired) to generate a purchase request in the format of a unit-based transaction.

In some embodiments, POS terminal 124 may similarly process unit-based transactions by reading card information from unit-payment card 106. In these embodiments, user 102 may select an amount of gasoline to be redeemed in real time at merchant system 120, for example, at a specific gas station. This user selection may be captured by POS terminal 124 via a provided graphical user interface or another user interface coupled to POS terminal 124. Both card information and user selection may be forwarded to TXN server 126 that generates a redeem request in the format of a unit-based transaction. Then, TXN server 126 may route the generated redeem request to payment processor 140 for further processing.

In some embodiments, POS terminal 124 may receive a payment request via, for example, value-payment card 104. If merchant system 120 detects (e.g., receives information transmitted by mobile device 108 indicating presence of unit mobile payment 112) that user 102 is associated with a unit-based payment account, an interface of POS terminal 124 may offer user 102 an option to redeem the stored units within the unit-based payment account instead of paying with value-payment card 104 especially if the value-payment would cost more than the amount user 102 had spent on the stored units.

TXN server 126 may interface with payment processor system 140 to process unit-based transactions. For example, upon generating the purchase or redeem requests using information read or received by POS terminal 124, TXN server 126 may route these generated requests to payment processor 140. In an embodiment, TXN server 126 may also forward authentication information captured by POS terminal 124, biometric detection interface 122, or mobile device 108. TXN server 126 may store the authentication information within data store 130 or store the generated purchase or redeem requests as unit-based transaction records 132. In an embodiment, TXN server 126 may send qualitative information of the requested product info 134 stored in data store 130. At a later time, TXN server 126 may receive an authorization result corresponding to the previously routed request.

Within seconds, POS terminal 124 may receive an authorization result from TXN server 126 indicating whether the purchase request or redeem request was processed successfully. Then, POS terminal 124 may display the authorization result and print a receipt upon request. This authorization result may be generated by UBP system 160, as further described below.

In some embodiments, user 102 may not have been issued unit-payment card 106, in which case a purchase request may indicate that user 102 requests unit-payment card 106 to be issued. POS terminal 124 may be coupled to a card dispenser that dispenses unit-payment card 106 on site at a point of sale at merchant system 120, for example at a gas station kiosk, for these types of purchase requests. In some embodiments, an authorization result, (e.g., an approval message or a denied message), generated by UBP system 160 and received by POS terminal 124 may indicate that user 102 is not associated with any unit-based user account. In these cases, POS terminal 124 may also control the card dispenser to dispense unit-payment card 106 to user 102.

In the case of a purchase request of additional redeemable units of gasoline, i.e., user 102 is associated with a unit-based user account managed by UBP system 160, POS terminal 124 may indicate on the receipt or display that the requested redeemable units of the product had been added to the user account associated with unit-payment card 106. In this embodiment, POS terminal 124 may read card information from a stored-unit payment instrument (e.g., unit-payment card 106, unit mobile payment 112, or via UBP application 110) to identify the user account associated with user 102. Then, POS terminal 124 may receive payment via cash or value-payment card 104 to complete the purchase of additional redeemable units of gasoline.

In some embodiments, in the case of a redeem request to redeem an amount of gasoline, POS terminal 124 may be coupled to product dispenser 125, such as a gas pump. When authorization is successful, POS terminal 124 may control product dispenser 125 to release the redeemed amount of gasoline to user 102.

In some embodiments, POS terminal 124 may include circuitry to process contactless payment technologies, such as EMV chip or RFID tag implemented within unit-payment card 106. In an embodiment, POS terminal 124 may also include circuitry to read card information, such as unit mobile payment 112, via a proximate communication technology, such as NFC or Bluetooth, implemented on mobile device 108.

In some embodiments, instead of being a specially built hardware device, POS terminal 124 may be implemented within an application (sometimes called virtual terminal) on a mobile device such as mobile device 108 or another mobile device operated by the merchant. In an embodiment, upon reading payment card information, the virtual terminal may transmit the read information to merchant system 120, payment gateway 150, or payment processor system 140.

To ensure that user 102 is the true owner of unit-payment card 106 or unit mobile payment 112, merchant system 120 may request and receive information from user 102 for authenticating user 102. In some embodiments, merchant system 120 implements biometric detection interface 122 for detecting and forwarding biometric information of user 102 to payment processor system 140 or UBP system 160 for authentication.

In some embodiments, biometric detection interface 122 may include a camera coupled to facial recognition software for authenticating user 102 based on pictures of the user 102's face. In some embodiments, to prevent user 102 from using a photograph to fool the facial recognition software, the camera may take multiple pictures, which allows the camera to capture the face from different angles. The facial recognition software may then construct and compare a 3-D model of the head, which is harder to fake than a simple 2-D model (e.g. photograph), with a previously stored 3-D model of user 102's head.

Taking multiple pictures also address the challenge of differentiating features of the face under different lighting conditions. Because now that multiple photos are generated using the same background but varying only the head, the facial recognition software may have more training data to differentiate features of the head or face from the background in the photos. In an embodiment, biometric detection interface 122 may request user 102 to move his or her head in a certain pattern as pictures are taken to further increase the difficulty of using photographs to fool the facial recognition software.

In some embodiments, biometric detection interface 122 may further detect other biometric information, such as heart rate or blood vessel patterns, using the camera. For example, a high quality camera can detect heart rhythms that are then stored by biometric detection interface 122 in data storage 130. In another example, in slow motion, the camera can capture heartbeats based on minor motions of the skin. Biometric detection interface 122 may store the exact location of these pulses locations relative to other facial features. When camera authentication is requested, biometric detection interface 122 may forward the stored information to TXN server 126. TXN server 126 may send this stored information (heart rhythms or pulse locations) as additional authentication information used by payment processor system 140 or UBP system 160 to authenticate user 102.

Additionally, biometric detection interface 122 may include multiple cameras for creating multispectral stereoscopy images to capture blood vessel features of user 102. This technique may include taking multiple images of different spectral bands and decreasing image-size-settings. Biometric detection interface 122 may algorithmically distinguish contrasts from below the tissue surface from surface shadows, reflections, etc. to allow for selective enhancement of blood vessels. Then biometric detection interface 122 may store features of user 102 blood vessel to be used as authentication information further forwarded to TXN server 126.

To ensure that user 102 is the true owner of unit-payment card 106 or unit mobile payment 112, UBP system 160 may request mobile device 108 to periodically transmit or upload biometrics or behavior information sensed or recorded by mobile device 108 via UBP application 110. For example, when user 102 downloads UBP application 110 to mobile device 108, UBP application 110 may utilize a pedometer/motion detection chip implemented within mobile device 108 to create a user motion cadence profile. To protect privacy, UBP application 110 can generate a hash value unique to the user and that is representative of the user motion cadence profile. Then, UBP application 110 may upload the hash value, which contains no information identifying the actual motion. For example, a fast walker John's profile may generate a string XYZ while a similarly fast walker Bill's profile may generate a string ABC.

In some embodiments, when POS terminal 124 reads information from, for example, unit-payment card 106 or unit mobile payment 112, merchant system 120 may request that mobile device 108 transmit the biometrics or behavior information at the point of sale or within a period of time before the requested transaction. For example, UBP application 110 may send a hash value of user 102's motion profile to UBP system 160. If the sent hash value matches a previously stored hash value, UBP system 160 may generate a high authentication score to confirm validity of the unit-based transaction. In some embodiments, the behavior information may be weighted based on the type of action such that specific matching actions may increase the authentication score by a higher amount.

In some embodiments, similar to generating a hash value representing a motion profile, UBP application 110 may generate and store or transmit hash values unique to the user based on a detected action with a parameter. For example, when the user carries out action X with parameters {Y} (e.g. text John), UBP application 110 may generate a specific value to be transmitted or uploaded to UBP system 160. User 102's hash value, however, may differ from another user's and, as such, is difficult to reverse engineer what user 102 is doing that generated the specific hash value. Usage patterns and actions may include texts, calls, app usage, emails responses, etc. and parameters may include a length of messages, time of messages, responsiveness, a person of the action etc.

In some embodiments, UBP application 110 and UBP system 160 may store recent unit-based transactions that were processed by UBP system 160. This stored information may be used by mobile device 108 and UBP system 160 to authenticate each other. For example, mobile device 108 may determine the authenticity of UBP system 160 by querying UBP system 160 for specific portions of one or more previous unit-based transactions with mobile device 108 (e.g., portions may include at which gas station was gas redeemed on Jan. 31, 2015). In turn, UBP system 160 may authenticate mobile device 108 via a query for specific portions of recent unit-based transactions (e.g., the portion may be what is the total gallons redeemed on Jan. 31, 2015). In some embodiments, the portions of a unit-based transaction requested by mobile device 108 and UBP system 160 may need to be different. Mobile device 108 and UBP system 160 may flag that particular knowledge based challenge used and would not reuse that unit-based transaction in the future or only after a period of time had passed.

In some embodiments, UBP system 160 may further request GPS related information from mobile device 108 to authenticate user 102. For example, UBP application 110 may transmit a current GPS location of mobile device 108 that indicates which gas station (and which gas pump) user 102 may be currently using. When generating a unit-based transaction, TXN server 126 may include information, such as a GPS location, of merchant system 120. UBP system 160 may compare GPS location received from TXN server 126 and UBP application 110 to determine whether to authenticate user 102 and the unit-based transaction being processed.

Returning to merchant system 120, in addition to a physical POS terminal 124 for reading card information from either unit mobile payment 112 or unit-payment card 106, merchant system 120 may include merchant web server 128. Merchant web server 128 may provide a web portal to user 102 for either purchasing redeemable units of gasoline or redeeming one or more of the purchased units. For example, user 102 may provide card information of unit-payment card 106 within the web portal. In some embodiments, mobile device 108 may itself provide the card information (within unit mobile payment 112) and automatically populate the requested card information fields of the web portal.

Whereas POS terminal 124 may forward requests to TXN server 126 for routing to payment processor system 140, merchant web server 128 may forward received purchase or redeem requests to payment gateway 150. Payment gateway 150 may be an e-commerce application service provider service that authorizes unit-based transactions by routing information between web applications, such as a web portal provided by merchant web server 128, and payment processor system 140. Payment gateway 150 may be managed by the same party or a different party from payment processor system 140.

Payment processor system 140 may be managed by a company appointed by a merchant operating merchant system 120 to handle unit-based and/or value-based payment transactions for the merchant's bank (i.e., commonly called the acquiring bank). In an embodiment where payment processor is implemented with multiple companies, these companies may implement one or more of frontend payment processor 142, backend processor 144, and value-based issuing bank processor 146, independent sales organization (ISO), member service provider (MSP), card associations, aggregator, and remote deposit capturer, etc. In general, frontend payment processor 142 may verify the validity of monetary payment transactions by in part carrying out a series of anti-fraud measures against the monetary transactions. To validate the monetary transaction, payment processor system 140 may verify other transaction approval parameters such as country of issue and previous payment history. Based on the various verifications, payment processor system 140 decides whether to approve or deny the monetary transaction, and transmits the approval/denial decision to merchant system 120. Payment processor system 140 may be one or multiple companies.

Frontend processor 142 may also route transactions received from TXN server 126 or payment gateway 150 for authorization. In traditional monetary-based transactions initiated using value-payment card 104, frontend processor 142 may route the monetary transaction to value-based issuing bank processor 146 to verify whether that funds associated with value-payment card 104 are sufficient to cover the monetary transaction. For example, when the monetary transaction requests $100, value-based issuing bank processor 146 may check that value-payment card 104 is associated with a credit account having a remaining credit line exceeding or meeting $100. When the value-payment card 104 is associated with a debit account, value-based issuing bank processor 146 may check that the debit account has funds exceeding or meeting $100.

In unit-based transactions initiated using stored-unit payment instruments, frontend processor 142 may forward the purchase or redeem request (formatted as a unit-based transaction) to UBP system 160 for verification or authorization. After receiving an authorization result from UBP system 160, frontend processor 142 may route the received authorization result back to merchant system 120 via TXN server 126. For web-based purchase or redeem requests, frontend processor 142 may route the received authorization result to merchant web server 128 via payment gateway 150.

After frontend processor 142 perform the authorization processes, backend processor 144 may perform clearing and settlement of both value-based and unit-based transactions. For value-based transactions initiated by value-payment card 104, backend processor 144 may communicate with value-based issuing bank processor 146 to reconcile and, in some cases, confirm transfer transactions between records and accounts of payment processor system 140 and value-based issuing bank processor 146 prior to settlement. For unit-based transactions initiated by unit-payment card 106, backend processor 144 may communicate with UBP system 160 (that issued unit-payment card 106) to reconcile transaction records. In some embodiments, depending on merchant system 120 or payment processor system 140, payment processor system 140 may perform clearing of a batch of unit-based transaction records periodically (e.g., once a day.)

After clearing, backend processor 144 perform settlement of the cleared unit-based transactions between payment processor system 140 and UBP system 160. Like clearing, settlement may often be performed for batches of unit-based transactions. Unlike clearing, settlement may involve actual transfers of aggregate funds according to the reconciled records during clearing.

Unit-based processor (UBP) system 160 may be any party and serve a single function (e.g., providing and managing these redeemable products and associated unit-based transactions) or multiple functions (e.g., also being a payment card company, a bank, or merchant system 120). To provide and manage these redeemable products, UBP system 160 may implement UBP server 162 to purchase and/or sell one or more financial instruments from/on financial market system 154 to allow UBP system 160 to hedge against price fluctuations that ultimately impact the price of the underlying product (e.g., gasoline) provided by merchant system 120 to individual, such as user 102. These financial instruments may include commodities or derivatives such as forwards, futures, options, swaps, or spreads. In an embodiment, UBP server 162 may also purchase and/or sell other financial instruments including stocks (e.g., equities or shares) and debit (e.g., bonds and mortgages) depending on the type of product provided by merchant system 120.

Derivatives are financial contracts (or financial instruments) that derive value from the performance of an underlying entity, such as a commodity like crude oil or jet fuel. Common derivatives traded in exchange markets include futures and options contracts. A futures contract may enable a buyer of an asset such as jet fuel (derived from crude oil) to obtain price protection against adverse price movements. Particularly, a futures contract between the buyer, such as an airline, and a seller, such as a jet-fuel supplier, may require the buyer to purchase the asset (or the seller to sell the asset) at a predetermined, agreed-upon future date and price.

While a futures contract may obligate the holder to buy or sell an underlying asset, such as jet fuel, by expiration, an option contract may give the holder the right, but not the obligation, to buy or sell the underlying asset at a fixed price ("strike price") on or before a specified date (depending on the form of the option). The fixed price may be set based on a market price ("spot price") on the specified date, or it may be fixed at a discount or a premium.

In contrast to exchange trading, OTC trading may occur directly between two parties (or their brokers or bankers as intermediaries) without any supervision of an exchange. Common OTC derivatives may include forwards and swaps contracts. Forwards contracts may operate similarly to futures contracts at an exchange, and require the parties to exchange a given quantity of a physically delivered commodity for a currently defined price. But unlike futures contracts, forwards contracts may be non-standardized contracts that can be customized to the parties' needs. Swaps contracts may be derivatives in which two parties exchange cash flows rather than any transfer of underlying assets or commodities. Each derivative traded via OTC or an exchange may provide price protection for an agreed quantity or amount of a commodity on an agreed future date.

FIG. 2 is a block diagram 200 of unit-based processor (UBP) system 202 interacting with other systems such as merchant system 241, intermediary processor 244, and financial market system 250, according to an example embodiment. These systems may correspond to the similarly named systems of FIG. 1. Particularly, UBP system 202 illustrates the components with UBP system 160 at a greater granularity. In some embodiments, intermediary processor 244 may represent the systems such as payment processor system 140 and payment gateway 150 that routes requests and other information from merchant system 241 to UBP system 202.

Financial market system 250 may include various types of markets and exchanges in which entities such as unit-based processor system 202, merchant system 120 of FIG. 1, product supplier system 152 of FIG. 1 may trade financial instruments (e.g., securities or commodities). For example, financial market system 250 may include futures exchanges 256, commodities exchanges 258, securities exchanges 260, and other exchanges 262. Other exchanges 262 may refer to, for example, currency markets or stock exchanges. In some embodiments, financial market system 250 may also include clearinghouse 254 for providing clearing and settlement service, as one of ordinary skill would understand.

Each of these exchanges may be managed by one or more organizations that facilitate trade, including the trade of financial instruments. These exchanges may be open or closed. In some embodiments, each of these exchanges are implemented on one or more servers and enable entities to engage in financial transactions through trading platforms.

For example, an entity like UBP system 202 may utilize these trading platforms to access the various exchanges of financial market system 250 via exchange communication network 252.

UBP system 202 may communicate with intermediary processor 244, merchant system 241, and POS terminal 242 associated with merchant system 241 via communication network 240. Communication network 240 may correspond to communication network 156 of FIG. 1 and represent, for example, LAN, WAN, the Internet, and be implemented using wired and/or wireless communication protocols.

Similarly, UBP system 202 may communicate with financial market system 250 via exchange communication network 252. Though exchange communication network 252 may utilize similar technologies and protocols as communication network 240, exchange communication network 252 may be managed or regulated by one or more exchanges of financial market system 250.

UBP system 202 may include various servers 208, 210, 212, and 230 and data store 214 to process the unit-based transactions of purchase or redeem requests. UBP system 202 may include UBP server 230, network interface 206, web server 208, authentication server 210, encryption certificate server 212, and data store 214. Each of these components may communicate with one or more other components via network 204 within UBP system 202.

Network interface 206 may manage one or more networking chips, servers, or other circuitry to provide network connectivity (or communication channels) to UBP system 202. For example, network interface 206 may enable UBP system 202 to communicate over communication network 240 or exchange communication network 252. In some embodiments, network interface 206 may support various technologies and protocols such as, LTE, 3G, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), or Multiprotocol Label Switching (MPLS).

Encryption/certificate server 212 may encrypt or decrypt electronic communications sent to or received from communication network 240, respectively. In some embodiments, encryption/certificate server 212 may encrypt or decrypt electronic communications sent to or received from communication network 252, respectively. Encryption/certificate server 212 may implement various types of cryptography techniques such as public/private key encryption, and algorithms for encrypting and decrypting the electronic communications.

In some embodiments, encryption/certificate server 212 may generate tokens or certificates that UBP system 202 sends or assigns to other systems such as POS terminal 242, intermediary processor 244, or mobile device 108 of FIG. 1, that are later used in authenticating the entity receiving the tokens or certificate.

Authentication server 210 may authenticate an entity using various types of authentication techniques including token-based or certificates-based authentication. In some embodiments, authentication server 210 may communicate with UBP server 230 or encryption/certificate server 212 to process encrypted communications, tokens, or certificates.

For example, in some embodiments, UBP system 202 may receive merchant information, related to merchant system 241. The merchant information may include one or more of a merchant identifier/token, a merchant verification code/token, a merchant cost information, and the merchant's supplier information. In some embodiments, this merchant information may be received within purchase or redeem requests, or received in separate messages from POS terminal 242 or intermediary processor 244.

To authenticate merchant system 241, authentication server 210 may use the merchant identifier/token to identify the merchant's record in data store 214. The identifier may be an account number and/or one or more encrypted files. The encrypted file may be a file generated by encryption/certificates server 212 or by merchant system 241, encrypted using a public/private key model, and used by UBP system 202, such as authentication server 210, to authenticate the merchant system. The file may include algorithms or code snippet the results of which is return to authentication server 210 as part of the authentication.

Authentication server 210 may confirm the identity of merchant system 241 using the merchant verification code/token. By authenticating merchant system 241, UBP system 202 may reduce paying of fraudulent claims. The verification token may take the form of a data string, a file, an Internet Protocol address, a third-party authentication confirmation, an encryption key (e.g. public/private key encryption), an authentication certificate, and so forth. The token may be chosen/created by merchant system 241, or encryption/certificate server 212 and sent to merchant system 241, or by a trusted third-party. The token may be static or constantly changing. In the case of an encryption key, the encryption process itself serves as a token.

Data store 214 may be a repository such as a database for storing information and records associated with user account 216, a redeemable product 218, merchant 226, financial instrument 222, and transaction (TXN) record 224. In some embodiments, user account 216 may correspond to and be associated with a stored-unit payment instrument (e.g., a unit-based payment card) issued to a user. User account 216 may store a representation (e.g., records or transactions) that indicate redeemable balances (or amounts) of redeemable products.

In some embodiments, information associated with product 218 may include indications of specific types of products that are redeemable and associated merchant systems 241 that provide the redeemable product. In some embodiments, data store 214 may also store quantitative information (e.g., quality, value, hardness, scarcity, etc.) of product 218.

In some embodiments, information associated with financial instrument 222 may include purchase or sell (or offer) transactions issued or processed by UBP system 202. In some embodiments, data store 214 (or UBP server 230) may cache current statuses of certain financial instruments 222 offered by one or more exchanges of financial market system 250.

In some embodiments, information associated with merchant 226 (such as merchant system 241) may include the types and quantities of product 218 offered by merchant 226 as well as current or historical prices of product 218 offered by merchant 226.

In some embodiments, information associated with TXN record 224 may include unit-based transactions of purchase and redeem requests processed by UBP system 202 as well as purchase/offer transactions between UBP system 202 and financial market system 250. In some embodiments, TXN record 224 may also include settlement transactions managed by settlement component 237 between UBP system 202 and merchant system 241 and intermediary processor 244.

Web server 208 may provide and manage a web portal or software application provided to users to purchase a unit-based financial instrument or to refill (or increase) the redeemable amount of a product associated with the unit-based financial instrument. In some embodiments, web server 208 may enable any user to access his or her user account 216 and associated balances, statuses, and transactions via communication network 240 or other networks. In some embodiments, instead of using POS terminal 242 at merchant system 241, the user may access the web portal or the software application to redeem an amount of a product. Thus, a user may communicate directly with UBP system 202.

UBP server 230 may provide and manage stored-unit payment instruments provided to users, such as user 102 of FIG. 1. Particularly, UBP server 230 may be implemented on one or more processors to process requests to purchase redeemable units of a product and requests to redeem an amount of the product at a merchant system, such as merchant system 120 of FIG. 1. In some embodiments, UBP server 230 may include the following components: monitoring component 232, exchange component 234, authentication component 236, authorization component 238, settlement component 237, and device-information processing component 239. A component of UBP server 230 may include a selection of stored operations that when executing in the one or more processors of UBP server 230 causes the one or more processors to perform the operations of the component.

Device-information processing (DIP) component 239 may receive, and likely store, information captured by one or more sensors of a device, such as mobile device 108 of FIG. 1, associated with a user. Information captured by the device may include, for example, biometric or behavioral information (described with respect to FIG. 1), or input from the user operating the device. Information stored by DIP component 239 may be used to authenticate the user or the device. In some embodiments, DIP component 239 may periodically request the device the send captured information or on demand. For example, authentication component 236 may request DIP component 239 to request the device to send specific information (e.g., fingerprint, heart rate, GPS, etc.) to authenticate the user.

In some embodiments, DIP component 239 may analyze received information of a user to predict how likely that user will issue, within a specified period of time, a purchase or redeem request at one of merchant server 241. For example, received information may include Global Positioning System (GPS) information. When the GPS location indicates that user is proximate (e.g., within a specified distance) to merchant system 241, DIP component 239 may predict that the user is more likely to issue a request.

Monitoring component 232 may monitor current statuses of various financial instruments offered by financial market system 250. In some embodiments, the monitoring component queries one or more financial exchanges 256-262, via exchange communication network 252, for a plurality of financial instruments that relate to product 218 stored in data store 214 or that are associated with users that issued redeem or purchase requests. In some embodiments, monitoring component 232 may periodically query one or more financial instruments, each related to different redeemable products. Monitoring component 232 may store or cache queried current statuses (e.g., price, volume, spreads, bids/asks, etc.) with financial instrument 222 on data store 214, or in a memory coupled to network 204. Monitoring component 232 may also associate a timestamp with each queried result.

In some embodiments, based on receiving anticipated (or predicted) requests from DIP component 239, monitoring component 232 may query for current statuses of various financial instruments related to a specific product before the request is issued by the user and received from, for example, POS terminal 242. In some embodiments, monitoring component 232 may periodically monitor current statuses, both before and after purchase or redeem requests are received or processed by UBP server 230.

Authentication component 236 may authenticate the user initiating the redeem or purchase request, POS terminal 242 transmitting the redeem or purchase request, merchant system 241, or intermediary processor 244. In some embodiments, authentication component 236 may perform some or all of the functionality described with respect to authentication server 210. In some embodiments, authentication component 236 may be an interface for communicating with authentication server 210. For example, upon receiving user information to be authenticated, authentication component 236 may forward the user information to authentication server 210 and request authentication server 210 to perform authentication.

Authorization component 238 may process and authorize redeem and purchase requests received via communication network 240. In some embodiments, authorization component 238 may receive these request directly from POS terminal 242 associated with a merchant system or from intermediary processor 244. POS terminal 242 may be a physical POS terminal at the merchant system, a virtual terminal on a mobile device, or a virtual terminal accessed via a web portal or web application. Intermediary processor 244 may be, for example, payment gateway 150, payment processor system 140, or any of the entities that make up payment processor system 140 as described with respect to FIG. 1. In some embodiments, intermediary processor 244 may modify the purchase or redeem request, such as by augmenting the request with a second request or with additional information. Example second requests includes transaction limits specific to the user (number of units redeemable/purchasable by the user), transaction limits not specific to the user (number of units redeemable/purchasable by other users at the current price), and so forth. Examples of the intermediary processor additional information includes authentication/identification of the processor, the intermediary processor batch upload of pricing requests, and so forth.

In some embodiments, electronic communications such as unit-based transactions of purchase or redeem requests sent to and received from communication network 240 may need to be encrypted or decrypted, respectively. Thus, authorization component 238 may perform the appropriate cryptographic transformation (encrypt or decrypt) before further processing. In some embodiments, due to the high performance that may be required, authorization component 238 may include an interface to communicate with encryption certificate server 212 for performing the appropriate cryptographic transformation.

In some embodiments, for a purchase request, authorization component 238 may receive, within the purchase request, an amount (e.g., number of units, referred to as a "request amount") of a product redeemable at a future time at merchant system 241. As described above, the information within purchase request may be augmented by the second request of intermediary processor 244 to include, for example, transaction limits associated with the user.

In some embodiments, authorization component 238 may perform a funds-approval check to determine whether funds from user are sufficient for the purchase request and associated transaction. In some embodiments, authorization component 238 may contact (e.g., via query or request) the user's financial institution, when funds are applied via a stored-value payment card, or receive confirmation via intermediary processor 244 when, for example, POS terminal 242 received the user's funds in cash form. In some embodiments, when funds are sufficient for the purchase request, authorization component 238 may send POS terminal 242 an approval message or a denied message. In some embodiments, authorization component 238 may send a message requesting the user to pay the difference if the price is not sufficient.

In some embodiments, for a redeem request, authorization component 238 may receive, within the redeem request, an amount (e.g., number of units, referred to as a "redeem amount") of a product the user wishes to redeem at merchant system 241. In some embodiments, the redeem request may also include information allowing settlement component 237 to determine the monetary amount merchant system 241 is requesting for each unit of the product that merchant system 241 delivers to the user.

To authorize the redeem request, authorization component 238 may query data store 214 for information of user account 216 to determine whether the requested redeem amount exceeds an amount (e.g., number of units, referred to as a "redeemable amount" or a "stored amount") of the product associated with user account 216. If the user has a sufficient amount of the product in user account 216, authorization component 238 may generate and transmit, to POS terminal 242, a message indicating approval of the redeem request. In some embodiments, authorization component 238 may balance user account 216 by decrementing the redeemable amount by the requested redeem amount.

Settlement component 237 may settle the accounts of UBP system 202 and merchant system 241 based on an authorization result of processed redeem and/or purchase requests. In some embodiments, as part of processing redeem requests and with respect to the reimbursement schedule requested by merchant system 241, settlement component 237 determines the level or amount to which UBP system 202 will reimburse merchant system 241.

In some embodiments, settlement component 237 may reimburse the user directly independent of merchant system 241 providing the redeemed product. As described above, for redeem requests, the user may use a unit-payment card (or unit mobile payment) issued to the user by UBP system 202 to initiate the redeem request. For example, the user may swipe his unit-payment card at POS terminal 242. Authorization component 238 may determine the user account 216 based on the received information to generate the authorization result or message. In some embodiments, POS terminal 242 may read the user's unit-payment card information and additionally request the user to pay for the requested redeem amount at a current market price of the product provided by merchant system 241. POS terminal 242 may request additional payment, i.e., charge the user, regardless of whether the redeem amount exceeds a redeemable amount of the product stored with the user account 216. The UBP system 202, which may have additional user account information such as the user's value-based account, would transfer funds from the unit redemption to the user's value-based account.

In some embodiments, when the user pays using a value-payment card, settlement component 237 may reimburse the user's value-based account associated with the value-payment card. For example, settlement component 237 may send to the bank that issued the value-payment card, via communication network 240, the amount (e.g., in a currency like the USD) charged by POS terminal 242 to the user's value-based account. The reimburse would be to the value-payment card used to pay for the transaction. In some embodiments, the reimbursement would be to a different value-based account in the UBP system that is associated with the user.

In some embodiments, if merchant system 241 does not provide redeemable products and will request more than the locked price associated with the product indicated in the redeem request (e.g., the user went to a different, more expensive gas station), settlement component 237 may indicate the reimbursement level corresponding to the less-expensive locked price, and merchant system 241 may be responsible for collecting additional funds from the user. Alternatively, POS terminal 242 may give the user an option to use additional amounts (available in user account 216) of the redeemable good to cover the price differences, thereby exchanging value of the redeemable product to cover the balance of merchant system 241's more expensive rates. In scenarios where merchant system 241's rates are below the locked-prices of the redeemable product, settlement component 237 may refund the balance to the user in the form of a cash refund or in the form of additional amounts of redeemable product. In some embodiments, depending on the type of the product offered and parameters specified by merchant system 241, the reimbursement level determined by settlement component 237 may not cover the requested rate of merchant system 241 regardless of whether merchant system 241 provides redeemable products.

In some embodiments, for redeem requests, a received request may not include the number of redeemable units of the product that the user wishes to redeem and only indicate that the user wishes to redeem the product. In this case, authorization component 238 may query data store 214 to determine a remaining balance (e.g., an available amount) of a redeemable product in user account 216. Authorization component 238 may transmit this remaining balance to POS terminal 242 to indicate to POS terminal 242 that UBP system 202 can only reimburse POS terminal 242 with funds sufficient to cover the transmitted remaining balance. In some embodiments, POS terminal 242 may determine any uncovered (or insufficient) balance the user would need to pay and request alternative payment for the redemption of the product provided by merchant system 214 as appropriate.

Exchange component 234 may issue financial instrument transactions (e.g., orders to purchase or sell financial instruments) on financial market system 250 to provide unit-based financial instruments and to process purchase or redeem requests.

In some embodiments, for purchase requests, based, at least in part, on receiving a confirmation from POS terminal 242 that the user intends to or has completed the purchase of a redeemable amount (or unit) of a product provided by merchant system 241, exchange component 234 determines a combination of financial instruments to purchase that corresponds to the purchase request and the respective quantity or amount. In some embodiments, to determine the combination, exchange component 234 may issue queries to financial market system 250 to monitor pricing and other statuses of various financial instruments, as described with respect to monitoring component 232. Exchange component 234 may store the queried results in memory of UBP server 230 or UBP system 202, or within data store 214 as information of financial instrument 222. In some components, exchange component 234 may request monitoring component 232 to perform the querying or storing.

In some embodiments, one or more of these queries may have been conducted and previously stored in, for example, data store 214 by monitoring component 232 before user initiates the purchase request via, for example, POS terminal 242. Depending on the amount of time that has elapsed since the query (e.g., comparing a threshold amount of time with timestamps of the query), exchange component 234 may not need to re-query and update the information of previously queried financial instruments. These stored queries and related results (e.g., financial instruments and associated current statuses) may represent "cached" results used by exchange component 234 to select one or more financial instruments (within the combination) to process the purchase request. If the previous queries are stale or if the previous queries do not correspond to a received purchase request, exchange component 234 may still need to issue new queries in real time to one or more exchanges via exchange communication network 252.

The combination may correspond to the purchase request when the characteristics of the aggregated (or combined) financial instruments matches (applicable to quantitative and qualitative characteristics) or are in a tolerance range (applicable to quantitative characteristics) of the parameters specified in the purchase request. For example, based on the purchase request, parameters may include one or more of the type of request (e.g., purchase of redeemable units vs purchase of an option to redeem units), type of product (e.g., gasoline), units (e.g., 10 gallons), option period (e.g., two years), expiration date, product qualities (e.g., 87 octane), a source (e.g., Texas), a type of currency to pay for purchase (e.g., U.S. dollar), etc.

To illustrate with an example, if the user's purchase request is for gasoline provided by merchant system 241, exchange component 234 (or in some embodiments, monitoring component 232) may query futures exchanges 256 for the current status of futures contracts for one or more of crude oil, heating oil, gasoline, natural gas, Brent Crude oil, ethanol, the US Dollar Index, and so forth. On commodities exchanges 258, exchange component 234 may query for current statues of commodities like crude oil, natural gas, the US Dollar index, and so forth. On securities exchanges 260, exchange component 234 may query current statuses of stocks like NYMEX:CL, USO, OIL, UWTI, DBO, USD, and so forth. On other exchanges 262 (e.g. FOREX, etc.), exchange component 234 may query the current statuses of, for example, US Treasury Bonds, currency exchange rates, and so forth. For purchase requests (such as a derivatives option) with expiration dates, exchange component 234 may query financial instruments with varying expiration dates (e.g., June of this year, June of next year, etc.).

In some embodiments, exchange component 234 may combine multiple queried financial instruments (e.g., derivative contracts) to process or match the purchase request of the user because the product may be affected or be dependent on many different market factors. For example, in the illustrated example above, the queried and combined financial instrument may be related to a currency or the product of the purchase request. In another example, a user making the purchase request of gasoline may be located in Toronto, Canada. In this example, even if the queried oil prices were unchanged, the USD to CAD exchange rate may impact the current Canadian prices at a gas station (e.g., merchant system 241) in Toronto. Thus, exchange component 234 may determine a combination and generate an associated purchase offer containing both oil futures and currency futures. Subsequently, the user-requested-associated product may contain derivative contracts for both oil futures and currency futures.

In some embodiments, to determine the appropriate combination of financial instruments 222, exchange component may calculate relationships between or among the various queried financial instruments 222 stored in data store 214, along with the associated characteristics. To reduce the number of queried financial instruments to process, exchange component 234 may apply one or more relevancy filters to select financial instruments 222 whose terms, individually or in combination, would satisfy the requirements or parameters of the purchase request.

For example, if the purchase request indicates a product (e.g., gasoline) made in the United States (e.g. oil pumped from and refined in the United States), the relevancy filter may remove (or ignore) from the set queried financial instruments 222 those that do not meet the indicated criteria. In another example, if the purchase request indicates a 2-year expiration date, the relevancy filter may allow financial instruments 222 that could be used to produce a 2-year expiration date product to pass through and remain in the relevancy-filtered set of financial instruments. These financial instruments may include a weighted combination of contracts with 1.9-year expiration, 2.0-year expiration, and 2.1-year expiration. By combining various financial instruments, exchange component 234 effectively creates a low-pass filter that may reduce the effects of financial market fluctuations so that the value of the combination representative of the requested product more closely matches the product provided by merchant system 241 including, for example, matching the quality and price at the point of sale. In some embodiments where cached queries are not sufficient, exchange component 234 may not need to use the relevancy filter because exchange component 234 may generate new queries that are targeted to the characteristics of the requested product indicated by the purchase request.

In some embodiments, exchange component 234 may select one or more financial instruments from the relevancy-filtered set and further determine the appropriate weightings (e.g., quantities) of selected financial instruments to associate with and match the requested units of the redeemable product of the purchase request. Exchange component 234 may determine an aggregate price of the selected financial instruments to compare against a current point-of-sale price of the product at merchant system 241. In some embodiments, if the POS price is within a specific range of the aggregate price for the requested amount of redeemable units the user wishes to purchase, a pricing-approval check is satisfied.

In some embodiments, to determine the appropriate weighting set of financial instruments, exchange component 234 may determine an instrument-product price relationship between relevancy-filtered financial instruments and merchant POS prices. Historical pricing may be used in determining the product-price relationship. A relationship variance may also be determined between the financial instruments and merchant POS prices. Again, historical variance may be used in determining the relationship variance. In some embodiments, based at least in part on these two relationships, exchange component 234 selects one or more financial instruments, from the selected set, that fulfills predetermined variance constraints (e.g. thresholds) and price-relationship correlation constraints (e.g., thresholds).

In some embodiments, exchange component 234 may select the financial instruments and associated quantities needed to satisfy the constraints. This selection objective may be represented as follows: Let I denote the set of financial instruments that passes the relevancy-filter, where $i_n$ designates the $n^{th}$ instrument in the set. Let $x_n$ denote number of units of $i_n$, and X the set of $x_n$. Let Corr(I,X) denote the correlation of the instrument-product price relationship with sets I and X, and let Var(I,X) denote the variance of the correlation with sets I and X. The selection objective may be to find valid sets I and X that meet predetermined minimum thresholds for Corr and predetermined maximum thresholds for Var. Often, these price relationships and variance relationships may be non-linear, non-continuous functions, which makes calculating the appropriate weighted set of financial instruments non-trivial, with likely runtime boundaries of $O(x^n)$. In some embodiments, to reduce runtime behavior to less than $O(x^n)$ to speed up the selection of financial instruments, exchange component 234 may apply a simplex method to find a set of financial instruments or applies a simplex method satisfying less strict, predetermined threshold constraints, and halting the simplex method upon satisfying the constraints.

In some embodiments, exchange component 234 or monitoring component 232 may transmit pricing updates to POS terminal 242 periodically, at predetermined times, or when requested via query by POS terminal 242. For example, when user initiates the purchase request sent by POS terminal 242 to UBP server 230, POS terminal 242 may request updated pricing-approval information. Within a threshold period of time, when the user further issue requests to purchase additional redeemable units with merchant system 241 or at POS terminal 242, exchange component 234 may assume that the POS price is within the specific range and omit rerunning the pricing-approval check.

In some embodiments, upon determining the appropriate combination of the queried financial instruments, exchange component 234 may associate user account 216 (and associated unit-stored payment card) with the determined combination. In embodiments where exchange component 234 may associate user account 216 with portions (e.g., proportion or quantity) of the determined combination, exchange component 234 may record unmatched/non-associated portions of the purchased combination in data store 214. These non-associated portions may represent "cached" and preprocessed combinations used by exchange component 234 to match or associated future purchase requests. By caching purchased combinations, exchange component 234 may reduce congesting exchange communication network 252 by reducing queries to financial market system 250 at a point of sale. Further, the pre-processing (e.g., previous purchase) improves the performance of the UBP server 230 to determine an appropriate combination within time constraints at the point of sale.

In some embodiments, instead of determining the appropriate combination of financial instruments for each received purchase request, exchange component 234 may aggregate one or more purchase requests from one or more users. In such instances, exchange component 234 may batch purchase requests indicating the same products or products with one or more common characteristics. Further, exchange component 234 may approve the purchase request without determining the combination or placing a buy offer on financial market system 250. In some embodiments, exchange component 234 may perform the determining or placing at a later time when, for example, more processing capability is available, or when an aggregated number of units meets or exceeds a minimum threshold. This batch processing may enable UBP server 230 to provide the following technical improvements: increase the speed and processing of purchase requests, reducing the bandwidth congestion on exchange communication network 252 by reducing the number of queries and transactions (e.g., batched query vs many queries for each purchase request). Further, transaction costs may be lower when financial instruments are purchased in lot or transaction sizes specific to the instruments. For example, different currency has different lot sizes for transactions where purchases in smaller quantities are given unfavorable treatment by the exchanges (e.g. EURUSD lots sizes are commonly 100,000 units of the currency).

In some embodiments, for redeem requests, based, at least in part, on receiving the confirmation from POS terminal 242 that the user intends to or has completed the redemption at merchant system 241, exchange component 234 determines the financial instruments that composes the redeemed product and the respective quantity or amount. Due, at least in part, to the redeem request, exchange component 234 may place sell orders, via exchange communication network 252, on one or more exchanges of financial market system 250 to cover for the redeem request and associated unit-based redeem transaction. Examples of orders placed may include exercising call options, selling call options, selling futures, selling equities, short covering equities, and so forth. In some embodiments, the proceeds from the transaction may be used by settlement component 237 to reimburse merchant system 241 for allowing the user to redeem the requested amount (i.e., "request amount") of units of the product at a point-of-sale of merchant system 241 in real time. In some embodiments, exchange component 234 may place buy orders, sell orders, or a combination thereof to obtain sufficient proceeds to reimburse merchant system 241.

In some embodiments, exchange component 234 may process the received redeem request by matching the redeem request with one or more requests received from other users within a time period such that exchange component may engage in a mutual transaction without communicating with the various exchanges of financial market system 250. In some embodiments, these requests may be purchase requests that have not been cleared, matched, or processed by exchange component 234. Similarly, exchange component 234 may match a received purchase request with one or more previously received or concurrently received redeem requests. Exchange component 234 may determine which portions and how much of the redeem request matches the purchase requests of one or more other users. Any remaining unmatched portions or amounts of the redeem request may be processed by exchange component 234 as it typically processes such redeem requests.

In some embodiments, portions may refer to separate financial instruments because a previously processed purchase request may be associated with a combination of multiple financial instruments. For example, a purchase request, associated with a first user, may be processed by associating the purchase request with an offering including, for example, call options with 1.9-year, 2.0-year, and 2.1-year expiration contracts. But, exchange component 234 may be concurrently processing a redeem request, associated with a second user, associated with a previously purchased option including, for example, 2.0-year, 2.5-year, and 3.0-year expiration contracts. Instead of purchasing the offering for the purchase request and selling a portion of the previously purchased option to service the redeem request, exchange component 234 may match the 2.0-year expiration contracts by recording a transfer of the contract between the first and second users. Depending on whether the call options are American or European options, the options may either be exercised or transferred. In some embodiments, by matching requests or portions of requests, exchange component 234 may enable the technical effect of eliminating unnecessary transaction and query costs between UBP system 202 and financial market system 250. Further, reducing queries and transactions may also reduce data contention on exchange communication network 252.

Figure 3:
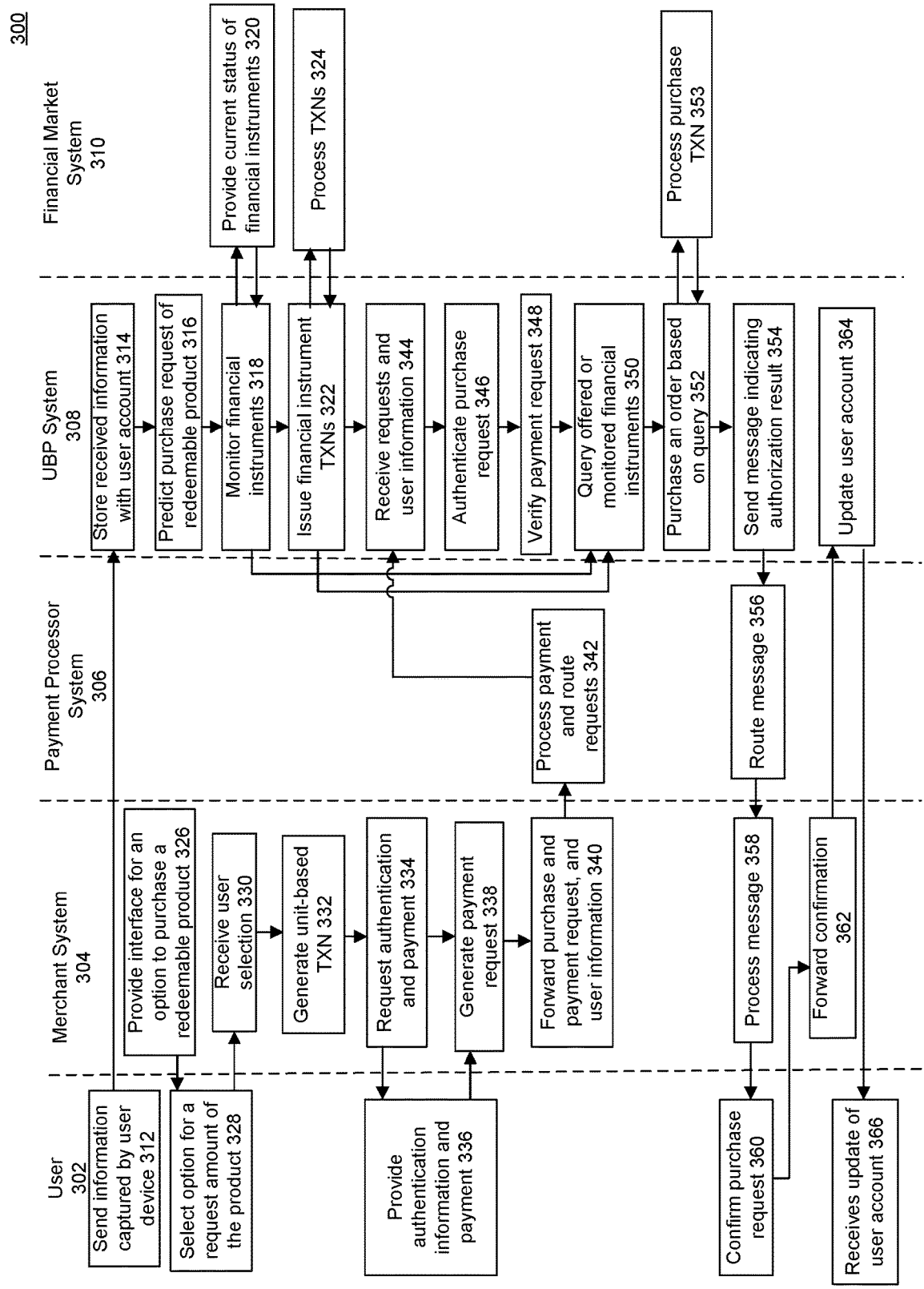
FIG. 3 is a flowchart of a method for processing unit-based transactions of purchase requests made using a stored-unit payment instrument, according to an example embodiment.
Figure 4:
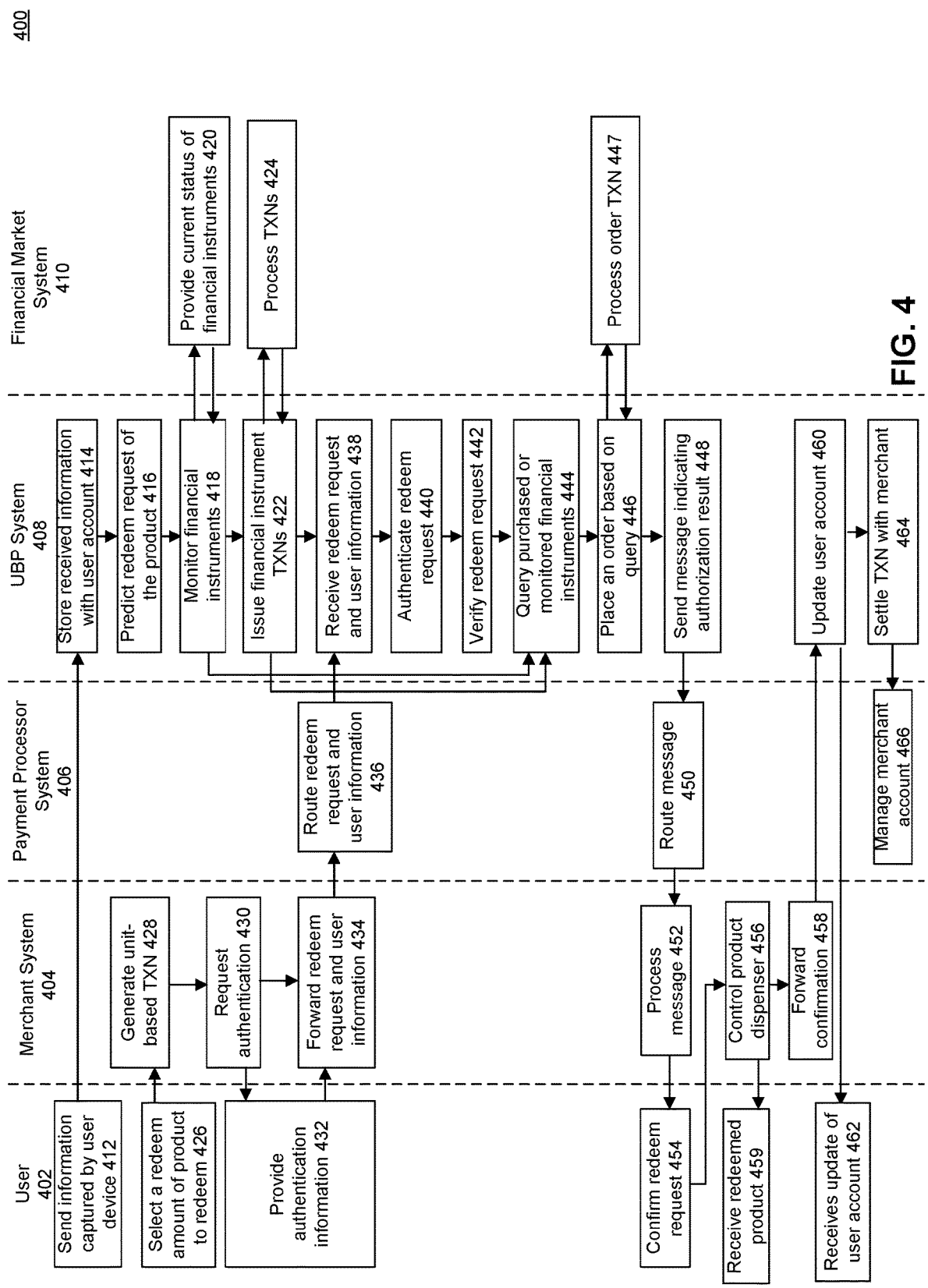
FIG. 4 is a flowchart of a method for processing unit-based transactions of redeem requests made using a stored-unit payment instrument, according to an example embodiment.

FIGS. 3-4 generally describe how the various systems interact with each other to process the unit-based transactions. FIG. 3 is a flowchart 300 of a method for processing unit-based transactions of purchase requests made using a stored-unit payment instrument, according to an example embodiment. Method 300 can be performed by processing logic that may comprise hardware (e.g., circuitry, dedicated logic, programmable logic, microcode, etc.), software (e.g., instructions running on a processing device), or a combination thereof. Flowchart 300 includes the following entities: user 302, merchant system 304, payment processor system 306, UBP system 308, and financial market system 310. Each of these entities may correspond to the similarly named entities of FIG. 1.

In step 312, a device, such as mobile device 108 of FIG. 1, operated by user 302, sends information captured by the device to UBP system 308. In some embodiments, the captured information may be information that correlates with how likely user 302 will purchase some amount of a first product at merchant system 304. In some embodiments, captured information may include information specific to user 302 such as behavioral or biometric information (described with respect to FIG. 1) usable by UBP system 306 to authenticate the device or user 302. Behavioral information may include, for example, a texting or calling pattern, an interne surfing pattern, an odometer reading pattern, or a battery level historical profile, etc. Biometric information of user 302 may include, for example, a finger print, a heart rate, a heartbeat rhythm, an iris scan, one or more pictures of the face, a speech pattern, a user voice, or brain waves, etc.

In some embodiments, captured information may include GPS information such as a current GPS location or a set of GPS locations within a time period (e.g., the past day, week, month etc.). The set of GPS locations may be captured periodically at different granularities (e.g., every 10 minutes, 1 hour, etc.). GPS information may be used as an indicator for how likely user 302 will purchase a redeemable amount of the first product and as a factor for authenticating user 302.

In step 314, a device-information processing (DIP) component of UBP system 308 associates, and in some embodiments store, the information received from step 312 with a unit-based user account of user 302. In some embodiments, the DIP component may associate, and in some embodiments store, the received information with a unit-based user account associated with the device of step 312.

In step 316, the DIP component uses the received information of step 314 to predict whether a request to purchase a redeemable amount of units of a product at merchant system 304 will be issued by user 302 or will be received by UBP system 308 within a threshold period of time. In some embodiments, the DIP component may predict a range of the amount of units expected in the future purchase request.

In some embodiments where the product is fuel such as gasoline and merchant system 304 is, for example, a gas station, the DIP component may use a proximity between the received current GPS information with merchant system 304 to predict whether user 302 will purchase a redeemable product, such as gasoline, at merchant system 304. In some embodiments where the DIP component stores a series of GPS locations, DIP component may estimate the distance driven by user 302, a current price of gasoline offered at various gas stations, or a remaining redeemable amount of the product, within the user account, to predict whether user 302 will soon purchase additional redeemable units of gasoline at merchant system 304 or at another gas station.

In step 318, a monitoring component of UBP system 308 monitors current statuses of various financial instruments offered by financial market system 310. In some embodiments, the monitoring component queries one or more financial exchanges, via an exchange communication network managed by financial market system 310, for a plurality of financial instruments that relate to the product identified in step 316. In some embodiments, the monitoring component may periodically query for one or more financial instruments, each related to different products. In some embodiments, the monitoring component may monitor the current statuses periodically and throughout the steps performed by UBP system 308.

In step 320, financial market system 310 provides the current statuses of the queried financial instruments of step 318 to the monitoring component. In some embodiments, financial market system 310 may continually or periodically update the statuses of the financial instruments based on transactions of UBP system 308 and other parties exchanging financial instruments in one or more exchanges of financial market 310. The monitoring component may store or cache, within a data store or other memory of UBP system 308, the queried statuses in association with respective financial instruments in data stores or memories of UBP system 308.

In step 322, an exchange component of UBP system 308 issues or processes financial instrument transactions with financial market system 310. In some embodiments, based on the predicted purchase request of step 316, the exchange component may purchase an order generated from one or more of the financial instruments previously queried by the exchange component and stored on a data store. The exchange component stores the purchased order as a transaction record in the data store. In some embodiments, depending on whether UBP system 308 authorizes the purchase request and receives confirmation of the purchase request in step 364, the transaction record may be used to authenticate the user, as further described with respect to mobile device 108 in FIG. 1.

In step 324, financial market system 310 processes the financial transactions of step 322. For example, financial market system 310 may match the selected one or more financial instruments with the purchase of step 322. In some embodiments, a clearinghouse of financial market system 310 may settle the transactions.

In step 326, merchant system 304, such as a POS terminal of merchant system 304, provides within an interface, such as a graphical user interface coupled to POS terminal 124 of merchant system 120 from FIG. 1, an option to purchase, at a current price, an amount (referred to as "request amount") of a first product redeemable at a future time at merchant system 304 or an other merchant system.

In 328, user 302 selects the option to purchase the request amount of the first product. In step 330, merchant system 304 receives the user selection from step 328. In some embodiments, user 302 may have already been issued a stored-unit payment instrument that is associated with a user account storing a representation of an amount (referred to as "redeemable amount") of the product. In these embodiments, user 302 may also provide information of his or her stored-unit payment instrument to merchant system 304.

In step 332, merchant system 304 generates a purchase request corresponding to the received user selection. In an example, the POS terminal or a TXN server, such as TXN server 126 of FIG. 1, generates the purchase request in a unit-based transaction format. The unit-based transaction may specify the request amount of the product to be redeemed at a future time with merchant system 304. In some embodiments, depending on the purchase request, such as for a request to purchase an option, the formatted unit-based transaction may include an expiration date of the option.

In step 334, the POS terminal requests user 302 to provide authentication and payment information via, for example, a graphical user interface. In some embodiments, merchant system 304 may request one or more types of authentication information as discussed above with respect to steps 312 or biometric detection interface 122 of FIG. 1.

In step 336, user 302 may provide the requested authentication and payment information. For example, payment information may include cash or a value-based financial instrument (e.g., credit or debit card).

In step 338, responsive to receiving the authentication and payment information, the POS generates a payment request 338. In some embodiments where the payment is cash received by POS terminal, the POS terminal may verify whether the provided funds (i.e., cash) was sufficient to pay for the selected option of step 328. The generated payment request may be a message that indicates whether the funds are sufficient. In some embodiments where the payment is a value-based financial instrument, the POS terminal may read information stored on the value-based financial instrument. The generated payment request may include the information identifying and authenticating the value-based financial instrument.

In step 340, the POS forwards the purchase and payment requests as well as the user information to be used to authenticate user 302. In some embodiments, merchant system 304, such as the TXN server, may encrypt the user information, and may encrypt both the purchase and payment requests before transmitting the information to payment processor 306. The transmission may include information used for verifying the integrity of the transmitted information to prevent data tampering by third parties.

In step 342, a frontend processor, such as frontend processor 142 of FIG. 1, within payment processor 306 decrypts and processes the received authentication information and purchase request. In some embodiments, payment processor 306 may authenticate user 302 based on the received user information by comparing received user information and tokens with authentication information stored in association with user 302. In some embodiments, merchant system 304 may include hardware or software for performing portions of the authentication.

In some embodiments, the frontend processor may communicate with an issuing bank of the user's stored-value financial instrument to determine whether the funds associated with user 302 are sufficient to cover the purchase request. As part of processing, the frontend processor may route the purchase request, the payment requests, or the user information to UBP system 308. In some embodiments, the frontend processor may forward a result of verifying the payment request.

In step 344, an authorization component of UBP system 308 receives the payment and purchase requests, and the user information. The purchase request may specify the request amount (i.e., the amount redeemable at a future time) of the product to be purchased by user 302 at a current price of the product provided by merchant system 304. In some embodiments, the authorization component may receive the purchase request directly via a web portal or web application provided by UBP system 308. The authorization component of UBP system 308 may receive information from exchange component of UBP system 308 regarding the status of any monitored financial instruments of step 318 and exchanges (i.e., buy, sell, etc.) carried out in step 322.

In some embodiments where user 302 was previously issued a stored-unit payment instrument, the authorization component may query and retrieve user 302's user account and associated redeemable amount (or stored amount) of the product based on information stored on the stored-unit payment instrument and captured by the POS terminal.

In step 346, an authentication component may compare user information (e.g., behavioral or biometric information) received from step 344 with user information stored in the data store of UBP system 308. The authentication component may authenticate the purchase request, user 302, and/or the device of user 302 when certain user information matches the authentication information stored in the data store.

In step 348, the authorization component verifies the purchase request by verifying that the payment exceeds or matches the purchase request. In some embodiments, this verification may be performed by and received from payment processor 306.

In step 350, the monitoring component queries previously purchased financial instruments in step 322 or monitored financial instruments of 318 to determine whether to purchase an order from financial market system 310. In some embodiments, the monitoring component may need to monitor one or more financial instruments associated with the requested product, from one or more exchanges of financial market system 310, in real time. When the monitoring component successively matches the purchase request with one or more previously purchased financial instruments, such as in step 322, the exchange component may not need to purchase one or more financial instruments from financial market system 310.

In some embodiments, for a purchase request of the request amount of the product redeemable at a future time, a matched financial instrument may specify an amount of a second product that is qualitatively associated with the first product. The specified amount may be different from the request amount. For example, when the first product is gasoline at a gas pump, the second product may be raw oil, wholesale gasoline, or a petroleum-based product.

In some embodiments, UBP system 308 may batch or aggregate the received purchase request, including a received request amount of the first product, with other unmatched purchase requests including respective amounts of the first product. At a later time, UBP system 308 may purchase one or more financial instruments from financial market system 310 to hedge against the batched purchase requests with a total aggregate amount of the first product to be redeemed at a future time.

In some embodiments, to process the received purchase request, the exchange component may aggregate or batch the received purchase request with a plurality of other purchase requests. The other purchase requests may specify respective amounts of the product to redeem at a future time. In some embodiments, aggregating or batching may include aggregating the request amount with each of the respective amounts. Then, based on the aggregated requests or summed amount, the exchange component purchases an order or option made up of one or more financial instruments.

In step 352, when previously purchased combination of one or more financial instruments is insufficient to balance the purchase request, the exchange component purchases one or more financial instruments from financial market system 310. The purchased one or more financial instruments may include, for example, derivative contracts, securities, etc.

In step 353, financial market system 310 processes the financial transactions of step 352 For example, financial market system 310 may transfer the one or more purchased financial instruments to UBP system 308. In some embodiments, a clearinghouse of financial market system 310 may settle the transactions.

In step 354, the authorization component sends a message to the POS terminal, via the communication network, to approve the purchase request upon the verifying of step 348, authenticating of step 346, and when the authorization component successively processed the purchase request in steps 350-352. In some embodiments, the authorization component may be successful if the authorization component matched the purchase request or batched the purchase request for processing at an other time. In some embodiments, the message may be sent to payment processor system 306.

In step 356, payment processor system 306 routes the received message to merchant system 304, such as the POS terminal, for processing in step 358.

In step 358, the POS terminal processes the message. In some embodiments, if the message is an approval, the POS terminal may display a confirmation message of the purchase request to user 302. If the message is a denial, the POS terminal may display an error or reason for the denied purchase request. For example, user 302 may have insufficient funds to pay for the request amounts of the product specified in the purchase request In step 362, once user 302 confirms the purchase request in step 360, the POS terminal forwards confirmation of the purchase request to UBP system 308. In some embodiments, the POS may forward confirmation to user 302 by printing, texting, or emailing a receipt to user 302. In some embodiments where the POS terminal is coupled to a card dispenser, when the user has not been issued a stored-unit payment instrument, the POS terminal may control the card dispenser to dispense a stored-unit payment instrument associated with a representation of the purchased request amount of the first product redeemable at a future time at merchant system 304 or other merchants.

In step 364, as part of or subsequent to authorizing the purchase request, the authorization component updates the user account of user 302. For example, when the purchase request is to increase the amount of the first product that is redeemable, the authorization component increases a current stored amount (or redeemable amount) of the first product stored in the user account by the purchased request amount.

In step 366, user 302 may receive updates of the user account and updated balances such as the incremented amount of the product of step 364. This updated account information may be printed within the receipt of step 362. In some embodiments, user 302 may observe the updates by logging into a web portal or UBP application provided by UBP system 308.

FIG. 4 is a flowchart 400 of a method for processing unit-based transactions of redeem requests made using a stored-unit payment instrument, according to an example embodiment. Method 400 can be performed by processing logic that may comprise hardware (e.g., circuitry, dedicated logic, programmable logic, microcode, etc.), software (e.g., instructions running on a processing device), or a combination thereof. Flowchart 400 includes the following entities: user 402, merchant system 404, payment processor system 406, UBP system 408, and financial market system 410. Each of these entities may correspond to the similarly named entities of FIG. 1. In some embodiments, various components of UBP system 408 may perform the illustrated states. These components may correspond to the similarly named components of FIG. 2.

In step 412, a device, such as mobile device 108 of FIG. 1, operated by user 402, sends information captured by the device to UBP system 408. In some embodiments, the captured information may be information that correlates with how likely user 402 will redeem some amount of a first product at merchant system 404. In some embodiments, captured information may include information specific to user 402 such as behavioral or biometric information (described with respect to biometric detection interface 122 of FIG. 1 and step 312 of FIG. 3) usable by UBP system 406 to authenticate the device or user 402.

In some embodiments, captured information may include GPS information such as a current GPS location or a set of GPS locations. This GPS information may be used as an indicator for how likely user 402 will redeem the first product, and as a factor for authenticating user 402.

In step 414, a device-information processing (DIP) component of UBP system 408 stores the information received from step 412 with a unit-based user account of user 402. In some embodiments, the DIP component may store the received information with a unit-based user account associated with the device of step 412.

In step 416, the DIP component uses the received information of step 414 to predict whether a request to redeem units of a product at merchant system 404 will be issued by user 402 or will be received by UBP system 408 within a threshold period of time. In some embodiments where the product is fuel such as gasoline and merchant system 404 is, for example, a gas station, the DIP component may use a proximity between the received current GPS information with merchant system 404 to predict whether user 402 will redeem gasoline at merchant system 404. In some embodiments where the DIP component stores a series of GPS locations, DIP component may estimate the distance driven by user 402 to predict whether user 402 will soon redeem gasoline, and if so, at merchant system 404 or at another gas station.

In step 418, a monitoring component of UBP system 408 monitors current statuses of various financial instruments offered by financial market system 410. In some embodiments, the monitoring component queries one or more financial exchanges, via an exchange communication network managed by financial market system 410, for one or more financial instruments that relate to the product identified in step 416. In some embodiments, the monitoring component may periodically query one or more financial instruments, each related to different products. In some embodiments, the monitoring component may monitor the current statuses periodically, or throughout the steps performed by UBP system 408. For financial instruments associated with the product and that are purchased by an exchange component of UBP system 408, the monitoring component may store those purchased financial instruments in association with the product.

In step 420, financial market system 410 provides the current statuses of the queried financial instruments of step 418 to the monitoring component. The monitoring component may store, within a data store of UBP system 408, the queried statuses.

In step 422, an exchange component of UBP system 408 issues or processes financial instrument transactions with financial market system 410. In some embodiments, based on the predicted redeem request of step 416, the exchange component may place one or more orders generated from one or more of the financial instruments previously purchased by the exchange component and stored on a data store.

In step 424, financial market system 410 processes the financial transactions of step 422. For example, financial market system 410 may match the placed order of step 422 with a buyer that is purchasing the placed order. In some embodiments, a clearinghouse of financial market system 410 may settle the transactions.

In step 426, user 402 requests an amount (referred to as "redeem amount") of a product to redeem. Before redeeming any amount of the product, user 402 may have been issued a stored-unit payment instrument that is associated with a user account storing a representation of an amount (referred to as "stored amount" or "redeemable amount") of the product.

In step 428, a POS terminal of merchant system 404 generates a unit-based transaction based on the request received, via a communication network. The request may specify the redeem amount of the product to be redeemed by the user in real time with the merchant system.

In step 430, the POS terminal requests user 402 to provide authentication information via, for example, a graphical user interface.

In step 432, user 402 provides the authentication information. In some embodiments, the authentication information may be biometric or behavioral information described with respect to step 412 that is captured by a device owned by user 402 or by a device, such as a video camera, operated by merchant system 404.

In step 434, the POS terminal forwards the redeem request and user authentication information to payment processor system 406.

In step 436, payment processor system 406 further routes the redeem request and user information to UBP system 408.

In step 438, an authorization component of UBP system 408 receives the redeem request that specifies the redeem amount of the product to be redeemed by user 402 in real time with merchant system 404. In some embodiments, the authorization component may query and retrieve user 402's user account and associated redeemable amount of the product based on information stored on the stored-unit payment instrument and captured by the POS terminal. In some embodiments, the authorization component of UBP system 408 receives information from the exchange component of UBP system 408 of step 422.

In step 440, an authentication component may compare user information (e.g., behavioral or biometric information) received from step 436 with user information stored in the data store of UBP system 408. The authentication component may authenticate the redeem request, user 402, and/or the device of user 402 when certain user information matches the authentication information stored in the data store. In some embodiments, the authentication component may request an authentication server within UBP system 408 to perform the authentication.

In step 442, the authorization component verifies the redeem request by verifying that the redeemable amount of the product (within the queried user account) exceeds or meets the requested redeem amount.

In step 444, the monitoring component queries previously purchased financial instruments in step 422 or monitored financial instruments of 418 to determine whether to generate and place an order with financial market system 410. In some embodiments, the monitoring component may need to monitor one or more financial instruments associated with the requested product, from one or more exchanges of financial market system 410, in real time.

In some embodiments, to process the redeem request, the exchange component may aggregate the redeem request with one or more other received requests specifying respective amounts of the product to redeem by aggregating the redeem amount with each of the respective amounts of the one or more received requests. Then, based on the aggregated requests or summed amount, the exchange component places the order generated from some of the purchased one or more financial instruments.

In some embodiments, the exchange component may transfer one or more financial instruments associated with different user's respective accounts based on the different user's requests. For example, the authorization component may receive, from a second POS terminal, a second request that indicates a second user wishes to purchase an option to redeem an amount ("an other request amount") of the product. To minimize transactions with exchanges of financial market system 410, the exchange component performs a mutual transaction between the user and the second user. This mutual transaction may include dissociating a portion of the purchased one or more financial instruments from the user and associating that portion with the second user. In some embodiments, the portion is based on a difference between the requested redeem amount to be redeemed and the other request amount to be purchased.

In step 446, when previously purchased combination of one or more financial instruments is insufficient to balance the redeem request, the exchange component places a new order generated from one or more of the previously purchased financial instruments of, for example, step 422. The placed order may be one or more of exercising a call option, selling a call option, selling a future, selling an equity, or short covering an equity.

In step 447, financial market system 410 processes the financial transactions of step 446. For example, financial market system 410 may match the placed order of step 446 with a buyer that is purchasing the placed order. In some embodiments, a clearinghouse of financial market system 410 may settle the transactions.

In step 448, the authorization component sends a message to the POS terminal, via the communication network, to approve the redeem request upon the verifying of step 442 and/or authenticating of step 440. In some embodiments, the message may be sent to payment processor system 406.

In step 450, payment processor system 406 routes the received message to the POS terminal in step 452.

In step 452, the POS terminal may process the message received from payment processor system 406. In some embodiments, if the message is an approval, the POS terminal may display a confirmation message of the redeem request to user 402. If the message is a denial, the POS terminal may display an error or reason for the denied redeem request. For example, user 402 may have insufficient redeemable amounts of the product stored in his account.

In step 456, once user 402 confirms the redeem request in step 454, the POS terminal controls a product dispenser (e.g., an oil pump) to dispense the requested redeem amount of the redeemable product and user 402 receives the redeemed product. Then, in step 459, user 402 receives the redeemed amount of the product.

In step 458, the POS terminal forwards to UBP system 408 the confirmation that user 402 received the redeemed product. In some embodiments, the POS terminal may print or email a receipt to user 402 indicating the processing of the redeem request.

In step 460, the authorization component decrements, within the representation of the user account, the redeemable amount of the product by the redeem amount.

In step 462, user 402 may receive updates of the user account and updated balances such as the decremented amount of the product of step 460. In some embodiments, user 402 may observe the updates by logging into a web portal or UBP application provided by UBP system 408.

In step 464, a settlement component of UBP system 408 may balance and settle the unit-based transactions of the redeem request with respect to the merchant's accounts. In step 466, payment processor system 406 may manage and update an account of merchant system 404 to settle redeem transactions with UBP system 408.

Figure 5:
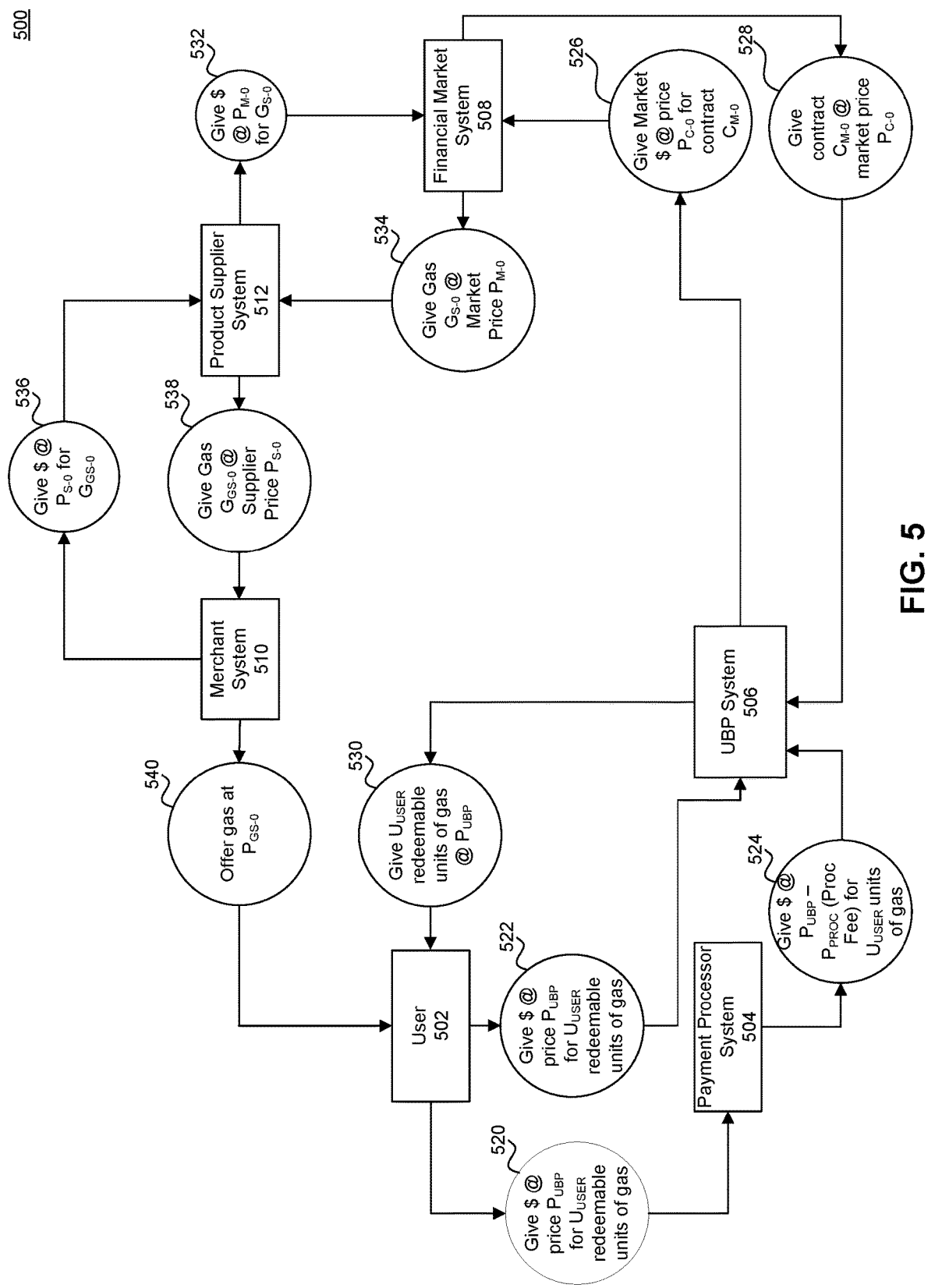
FIG. 5 is a diagram of logic implemented by systems to provide a stored-unit payment instrument, according to an example embodiment.
Figure 6:
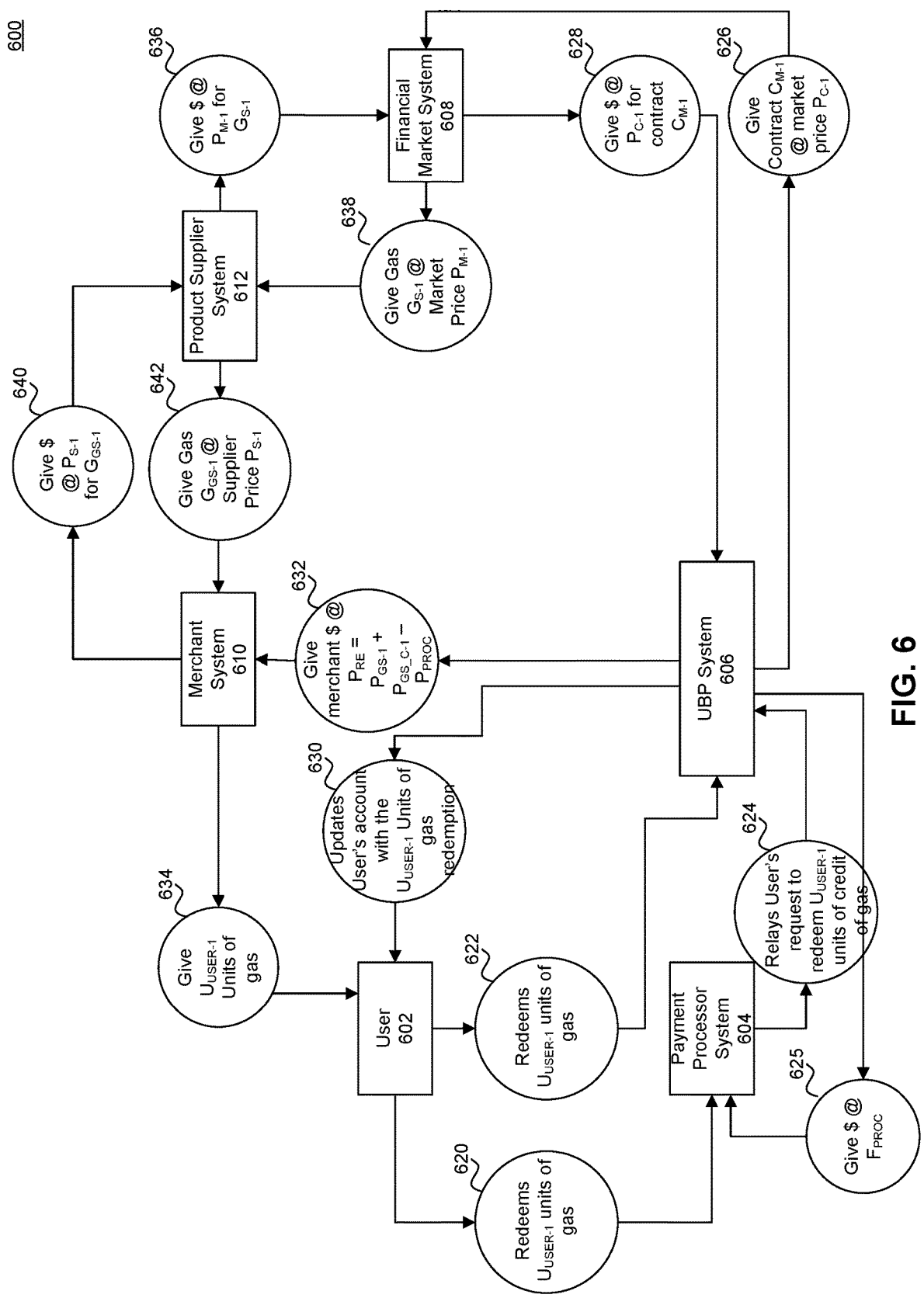
FIG. 6 is a diagram of logic implemented by systems to provide redeemed units stored on a stored-unit payment instrument, according to an example embodiment.

FIGS. 1-2 generally describe the technology implemented by various systems to securely process unit-based transactions in real time at a point of sale. FIGS. 3-4 generally describe how the various systems interact with each other to process the unit-based transactions. But to provide individual users, such as user 102 of FIG. 1, with real-time, point-of-sale hedging capabilities of physical products, the systems of FIGS. 1-2 may also need to implement new logic previously absent from traditional systems. FIGS. 5-6 are diagrams illustrating some of the needed logic to process different types of unit-based transactions, in an example embodiment.

FIG. 5 is a diagram 500 of logic implemented by various systems to provide a stored-unit payment instrument, according to an example embodiment. Diagram 500 depicts user 502, payment processor system 504, UBP system 506, financial market system 508, merchant system 510, and product supplier system 512. Each of these systems may correspond to similarly names systems of FIG. 1. For illustrative purposes only, the following logic will be described with respect to gasoline and associated units, for example, gallons or barrels of gasoline. The logic may similarly be applied to other types of products in other types of units.

Merchant system 510, such as a gas station, interacts with product supplier 512 to obtain a retail-version of a product. With respect to logic, product supplier system 512 charges merchant system 510 a supplier price $[P_{S\text{-}0}]$ per unit of gasoline at time 0. To purchase a gas station units $[G_{GS\text{-}0}]$ of wholesale gasoline, merchant system 510 may pay 536 product supplier system 512 an amount $[P_{S\text{-}0}]^*[G_{GS\text{-}0}]$, and product supplier system 512 may deliver 538 $[G_{GS\text{-}0}]$ units of gasoline at price $[P_{S\text{-}0}]$. This financial transaction between product supplier system 512 and merchant system 510 may be conducted with cash, a bank check, an electronic fund transfer (EFT), or with any method of payment 536. As an illustrative example, if the price $[P_{s\text{-}0}]$ of the wholesale gasoline were $1.00 USD per gallon and merchant system 510 purchases 5,000 gallons of gasoline, merchant system 510 would pay 536 product supplier system 512 $5,000 USD for the 5,000 gallons of gasoline. It is appreciated that the price rates (and the amount purchased) may vary in other embodiments based on market factors, regional inclement weather or factors associated with product supplier system 512 including, for example, local tax rates, operating fees, transportation fees, etc.

Product supplier system 512 may purchase 532 an amount of gasoline $[G_{S\text{-}0}]$ at the market price $[P_{M\text{-}0}]$, and financial market system 508, including for example raw oil producers, may send or transport 534 the purchased amount of gasoline $[G_{S\text{-}0}]$ at market price $[P_{M\text{-}0}]$. In some embodiments, product supplier 512 may be producers of the product itself and may not need to engage in financial transactions with financial market system 508.

Merchant system 510 may charge user 502 a current gas station price $[P_{GS\text{-}0}]$ 540 per gallon of gasoline that is generally different than the supplier price $[P_{S\text{-}0}]$. Merchant system 510 may slightly modify the gasoline (e.g., product) purchased from product supplier system 512 in logic 536, such as by adding or removing fuel additives. But the underlying product (e.g., gasoline) is still essentially gasoline. The price $[P_{GS\text{-}0}]$ offered 540 may be a function of $[P_{S\text{-}0}]$ and a gas station price adjustment $[P_{ADJ\_GS\text{-}0}]$. For example, the function may be: $[P_{GS\text{-}0}]=[P_{S\text{-}0}]+[P_{ADJ\_GS\text{-}0}]$. The gas station price adjustment often may include gasoline processing costs such as adding or removing fuel additives, operating costs, taxes and fees, and profits of merchant system 510.

When user 502, such as a driver of a gasoline-fueled automobile with a gasoline storage fuel tank, uses the automobile, the amount of fuel remaining in the automobile's fuel tank decreases. Because the capacity of the fuel tank is limited, the usage creates a space in the fuel tank to accommodate additional fuel. But user 502 cannot store more than the volume of the storage fuel tank. When a price of gasoline $[P_{GS\text{-}0}]$ is low, user 502 may wish to purchase additional gallons to be redeemed at a future time at merchant system 510 or other merchant systems (e.g., gas stations operated by different entities).

To purchase redeemable units of gasoline, user 502 may purchase (or increment the stored units within) a stored-unit payment instrument from UBP system 506. UBP system 506 may offer to sell user 502 gasoline at price $[P_{UBP}]$ per gallon of gasoline. When user 502 wishes to purchase $[U_{USER}]$ redeemable gallons of gasoline at price $[P_{UBP}]$, user 502 may pay 522 UBP system 506 an amount equal to $[U_{USER}]^*[P_{UBP}]$. In some embodiments, user 502 may instead purchase a futures option to redeem up to the $[U_{USER}]$ redeemable gallons of gasoline at price $[P_{UBP}]$ before the futures option expires at a predetermined, specified time. In this embodiment, instead of paying $[U_{USER}]^*[P_{UBP}]$, user 502 may pay a premium fixed fee $[F_{PRE}]$. Any time before the futures option expires, user 502 may pay for up to $[U_{USER}]$ gallons of gasoline at $[P_{UBP}]$.

UBP system 506 may charge user 502 a price $[P_{UBP}]$ for redeemable units (e.g., gallons) of gas that is different from but generally based on a current gas station price $[P_{GS\text{-}0}]$ offered 540 to user 502. The price $[P_{UBP}]$ offered by UBP system 506 may be a function of gas station price $[P_{GS\text{-}0}]$, user adjusted cost $[P_{USER\_C\text{-}0}]$, and UBP adjusted cost $[P_{ADJ\_UBP}]$. For example, the function may be: $[P_{UBP}]=[P_{GS\text{-}0}]+[P_{USER\_C\text{-}0}]+[P_{ADJ\_UBP}]$. The user adjusted cost may include the operating costs and profits of UBP system 506. The UBP adjusted cost may be affected by, for example, processing fees by merchant system 510, local tax rates, local gas station price differences, regional inclement weather, etc. In some embodiments, instead of a fee rate of $[P_{ADJ\_UBP}]$ and/or $[P_{USER\_C\text{-}0}]$ per unit of gas and depending on the type of product purchased, the fee may be a fixed fee $[F_{UBP}]$ added to the total amount of $[U_{USER}]^*[P_{UBP}]$ charged to user 502. In some embodiments, $[P_{ADJ\_UBP}]$ or $[F_{UBP}]$ may be negative, effectively leading to a fee refund to user 502.

In some embodiments, user 502 may pay 520 UBP system 506 for $[U_{USER}]$ redeemable amount of gasoline indirectly via payment processor system 504. In this example, payment processor 504 may charge an additional processing fee $[P_{PROC}]$ per gallon of gasoline before routing 524 the dollar amount received in logic 520. Thus, payment processor system 504 may forward an amount equal to $[U_{USER}]^*([P_{UBP}]-[P_{PROC}])$. In some embodiments, payment of user 502 may be captured by a POS terminal (at merchant system 610) that routes payment information to payment processor 604.

The number of units $[U_{USER}]$ user 502 may purchase from UBP system 506 may be limited. In some embodiments, UBP system 506 may limit the amount of gasoline $[U_{USER}]$ any one user, such as user 502, may purchase at a single point in time, with a time period, at a certain merchant system 510, etc. In some embodiments, UBP system 506 may limit the total amount of gasoline that can be sold at price $[P_{UBP-0}]$, such as 1 million total gallons sold at price $[P_{UPB-0}]$, and sells a different maximum amount at a different price $[P_{UBP-1}]$.

As part of processing unit-based transactions and as described with respect to FIGS. 3-4, UBP system 506 monitors various financial instruments (e.g., derivatives contracts or other types of contracts) provided by financial market system 508. To enable user 502 to purchase $[U_{USER}]$ redeemable gallons of gasoline at $[P_{UBP}]$, UBP system 506 may need to engage in financial transactions (e.g., purchase or sell one or more financial instruments) with financial market system 508. In some embodiments, UBP system 506 may match the purchase request (associated with logic 520 or 522) with a previous financial instrument that UBP system 506 purchased 526 from financial market system 508. In some embodiments, based in part on the purchase request, UBP system 506 may monitor available financial instruments on financial market system 508 and purchase 526 one or more financial instruments to associate with the purchase request.

In some embodiments, UBP system 506 may generate an offer to purchase 526 a financial instrument (or contract) $[C_{M-0}]$ at a contract price $[P_{C-0}]$ that may differ from the market price $[P_{M-0}]$. In general, financial instrument $[C_{M-0}]$ may be forwards, options, futures, swaps, or other types of contracts that specify an amount of a product to be traded at the price $[P_{C-0}]$. $[C_{M-0}]$ may refer to physical transfers of the product, or cash flows depending on the type of financial instrument purchased. Upon settling the purchase transaction of logic 526, financial market system 508 transmits 528 the financial instrument $[C_{M-0}]$ at price $[P_{C-0}]$ to UBP system 506. In some embodiments, price $[P_{C-0}]$ may have a price correlation (or corresponds exactly) with the market price $[P_{M-0}]$ of the gasoline purchased by user 502.

In some embodiments, UBP system 506 may determine or specify the financial instrument $[C_{M-0}]$ to be purchased based on type of the purchase request and the type of the redeemable product requested. For example, the product specified in the financial instrument $[C_{M-0}]$, e.g., wholesale gasoline, raw oil, heating oil, diesel, shale oil, may be a derivative of or associated with the requested redeemable product, in this case retail-version gasoline.

To complete the financial transaction, such as logic 520 or 522, initiated by user 502, UBP system 506 may give 530 user 502 a redeemable amount $[U_{USER}]$ of gasoline at price $[P_{UBP}]$. In some embodiments, UBP system 506 performs logic 530 by updating a unit-based account associated with user 502 to include the redeemable amount $[U_{USER}]$. When the unit-based account is updated, user 502 may operate a stored-unit payment instrument (such as a physical plastic card) for redeeming a portion of the $[U_{USER}]$ gallons of gasoline at merchant system 510, e.g., a gas pump, or at other merchant systems.

FIG. 6 is a diagram 600 of logic implemented by various systems to provide redeemed units of products stored in association with a stored-unit payment instrument, according to an example embodiment. Diagram 600 depicts user 602, payment processor system 604, UBP system 606, financial market system 608, merchant system 610, and product supplier system 612. Each of these systems may correspond to similarly names systems of FIGS. 1-5. Many of the logic may also be similar to the logic described with respect to FIG. 5. But many of the variables in FIG. 6 may be indicated with a subscript of 1 compared to a subscript of 0 in FIG. 5 to represent that the transactions in FIG. 6 occurs at a different time, $t_1$, from the transactions of FIG. 5 occurring at time $t_0$. For illustrative purposes only, the following logic will be described with respect to gasoline and associated units, for example, gallons or barrels of gasoline. The logic may similarly be applied to other types of products, and in other types of units.

Like merchant system 510 and product supplier system 512 of FIG. 5, merchant system 610, such as a gas station, similarly interacts with product supplier 612 to obtain a retail-version of a product (e.g., gasoline). Particularly, merchant system 610 may pay 640 product supplier system 612 for $[G_{GS-1}]$ at a supplier price of $[P_{S-1}]$, and product supplier system 612 may deliver 642 to merchant system 610 $[G_{GS-1}]$ gallons of gasoline at price $[P_{S-1}]$. Like product supplier system 512 of FIG. 5, product supplier system 612 may purchase 636 an amount of gasoline $[G_{S-1}]$ at the market price $[P_{M-1}]$, and financial market system 608 may transport 638 the purchased amount of gasoline $[G_{S-1}]$.

Merchant system 610 may offer user 602 a current gas station price $[P_{GS-1}]$ that is generally different than the supplier price $[P_{S-1}]$ much like how $[P_{GS-0}]$ may differ from $[P_{S-0}]$ as described with respect to FIG. 5. In some embodiments, $[P_{GS-1}]$ may be higher than $[P_{GS-0}]$ offered 540 by merchant system 510, which may be the same or different from merchant system 610. When user 602 approaches the gas station, such as merchant system 610, user 602 may choose to redeem $[U_{USER-1}]$ gallons of gasoline associated with an issued stored-unit payment instrument and previously purchased 520 or 522 at a lower price $[P_{GS-0}]$ as described with respect to FIG. 5.

In some embodiments, user 602 may redeem 620 $[U_{USER-1}]$ gallons of gasoline via payment processor system 604. For example, user 602 may swipe or otherwise use the issued stored-value financial instrument with a POS terminal of merchant system 610. Then, the POS terminal forwards the redeem request to payment processor system 604. Payment processor system 604 may route or relate 624 the user 602's redeem request for $[U_{USER-1}]$ gallons of gasoline to UBP system 606. In contrast to traditional transaction processing, payment processor system 604 does not route monetary transactions from user 602 to UBP system 606. In some embodiments, UBP system 606 may pay 625 a processing fee $[F_{PROC}]$ for redeem request routed by payment processor system 604. In some embodiments, fee $[F_{PROC}]$ may be a fixed fee, it may be proportional based on the $[U_{USER-1}]$ units redeemed, or both.

In some embodiments, user 602 may redeem 622 $[U_{USER-1}]$ gallons of gasoline directly with UBP system 606 when, for example, UBP system 606 and payment processor system 604 are managed by the same entity, or when user 602 redeems 622 by connecting to a web portal or through a UBP application provided by UBP system 606.

As part of processing unit-based transactions and as described with respect to FIGS. 3-4, UBP system 606 monitors various financial instruments (e.g., derivatives contracts or other types of contracts) provided by financial market system 608. To enable user 602 to redeem $[U_{USER\text{-}1}]$ gallons of gasoline independent of a current gas station price $[P_{GS\text{-}1}]$, UBP system 606 may need to engage in financial transactions (e.g., purchase or sell one or more financial instruments) with financial market system 608. In some embodiments, UBP system 606 may match the redeem request (associated with logic 620 or 622) with a previous financial instrument (or contract) $[C_{M\text{-}1}]$ that UBP system 506 offered 626 to financial market system 608 at a contract price $[P_{C\text{-}1}]$. In some embodiments, based in part on the received redeem request, UBP system 606 may generate one or more financial instruments, such as $[C_{M\text{-}1}]$, to sell or offer 626 on financial market system 608. The financial instrument $[C_{M\text{-}1}]$ may be similar to $[C_{M\text{-}0}]$ and be physical transfers of products or only cash flows depending on the type of financial instrument offered. Subsequent to offering 626 the financial instrument $[C_{M\text{-}1}]$, UBP system 606 may receive 628 compensation for the offered financial instrument $[C_{M\text{-}1}]$ at price $[P_{C\text{-}1}]$.

When UBP system 606 successively processed the redeem request of 620 or 622 as described with respect to FIGS. 1-2 and 4, UBP system 606 may send an approval message to merchant system 610. Then, merchant system 610 may dispense 634 or deliver to user 602 $[U_{USER\text{-}1}]$ gallons of gasoline. Upon successively processing the redeem request of 620 or 622, UBP system 606 updates 630 user 602's account with the $[U_{USER\text{-}1}]$ gallons of gasoline redeemed. For example, merchant system 610 may decrease the current amount of redeemable gallons of gasoline associated with the user 602's account by the redeemed $[U_{USER\text{-}1}]$ gallons.

To compensate merchant system 610 for $[U_{USER}]$ gallons of gasoline redeemed by user 602, UBP system 506 may reimburse 632 merchant system. The reimbursement price $[P_{RE}]$ per gallon of gasoline may be at a rate determined based on the current price $[P_{GS\text{-}1}]$ of gasoline at merchant system 610. For example, assume the current gas station price for gasoline is $[P_{GS\text{-}1}]=\$1.50$ per gallon and the price the oil supplier charges gasoline is $[P_{S\text{-}1}]=\$1.00$ per gallon. If user 602 redeems 620 $[U_{USER\text{-}1}]=10$ gallons of gasoline from merchant system 610, UBP system 606 may reimburse merchant system 610 at, for example, $[P_{RE}]=\$15$ (10 gallons at $1.50 per gallon) for the gasoline merchant system 610 dispensed 634 to user 602. In some embodiments, $[P_{RE}]$ may be decreased by a processing fee $[P_{PROC}]$ charged by UBP system 606 to provide merchant system 610 the ability to provide sale of redeemable units of a product and to redeem purchased units. In some embodiments, to recuperate the additional cost of $[P_{PROC}]$, merchants system 610 may factor the cost $[P_{PROC}]$ to determine an adjustment to the provided gasoline price $[P_{GS\text{-}1}]$ or $[P_{GS\text{-}0}]$ of FIGS. 5-6.

In some embodiments, the reimbursement price or rate $[P_{RE}]$ may vary based on the contract specified between merchant system 610 and UBP system 606. In some embodiments, the price $[P_{RE}]$ is based in part on the fuel supplier's rate $[P_{S\text{-}1}]$ (e.g., $1/gallon) and be a multiplier of $[P_{S\text{-}1}]$ (e.g. 1.4×$1/gallon), a fixed fee above $[P_{S\text{-}1}]$ (e.g. $0.50+$1/gallon), or both. In some embodiments, the price $[P_{RE}]$ is based in part on the merchant's price or rate $[P_{GS\text{-}1}]$ (e.g., $1.5/gallon) and be a multiplier of $[P_{GS\text{-}1}]$ (e.g. 0.9×$1.5/gallon), a fixed fee above/under $[P_{GS\text{-}1}]$ (e.g. $0.10+$1.5/gallon), or both. The merchant's rate $[P_{GS\text{-}1}]$ and the fuel supplier's rate $[P_{S\text{-}1}]$ may be influenced by market forces. Other factors that may influence the reimbursement price $[P_{RE}]$ may include market volatility, average of recent prices, geographical premiums, brand considerations, gas station fees, franchise costs, supplier considerations, source considerations, weather considerations, and so forth. These factors may be represented as $[P_{GS\_C\text{-}1}]$. Thus, in some embodiments, $[P_{RE}]=[P_{GS\text{-}1}]+[P_{GS\_C\text{-}1}]-[P_{PROC}]$.

In some embodiments, different merchants have different $[P_{GS\text{-}1}]$. In this case, UBP system 606 may negotiate a fixed markup it gives to certain merchants that accept this product-based transaction and enable user 602 to redeem units of gasoline. For other merchants outside of this group, in some cases, user 602 may receive gasoline but would still have to pay a portion of the higher price (or redeem the product at different rate). For example, for three merchants, $M_A$, $M_B$, and $M_C$. $M_A$ may currently charge $1.95 for gasoline ($[P_{GS\text{-}1}]=\$0.45$), $M_B$ may currently charge $2.00 for gasoline ($[P_{GS\text{-}1}]=\$0.50$), and $M_C$ may currently charge $2.10 for gasoline ($[P_{GS\text{-}1}]=\$0.60$). In some embodiments, user 602 may approach $M_A$ and $M_B$ to redeem gasoline at a 1:1 product-based account rate, i.e., user 602 may redeem $[U_{USER\text{-}1}]$ gallons independent of gasoline price $[P_{GS\text{-}1}]$.

In some embodiments, when user 602 approaches $M_C$, user 602 may not be able to redeem independent of the price at $M_C$ because $M_C$ is not a participating merchant. In some embodiments, when user 602 approaches $M_C$, user 602 may still be able to redeem 620 or 622 $[U_{USER\text{-}1}]$ gallons of gasoline. But user 602 may also need to pay the difference (e.g., $0.10/gallon) between the price $[P_{GS\text{-}1}]=\$0.60$ at $M_C$ and a price $[P_{GS\text{-}0}]=\$0.50$ used to purchase the $[U_{USER\text{-}1}]$ redeemable gallons of gasoline. In some embodiments, when user 602 approaches $M_C$, user 602 redeems gasoline at a rate proportional to the cost difference (e.g. although user 602 receives 10 gallons, 12 gallons may be deducted from the user's product-based account balance (e.g., $10*([P_{GS\text{-}1}]=\$0.60)/([P_{GS\text{-}0}]=\$0.50)$).

In some embodiments, UBP system 606 may reimburse the user directly independent of merchant system 610 that provides 634 the $[U_{USER\text{-}1}]$ gallons of gasoline. In these embodiments, user 602 may pay merchant system 610 for $[U_{USER\text{-}1}]$ gallons of gasoline at the merchant price $[P_{GS\text{-}1}]$. And UBP system 606 may reimburse user 602 with a total amount of $[U_{USER\text{-}1}]*[P_{GS\text{-}1}]$. In some embodiments where user 602 pays merchant system 610 using a value-payment card, UBP system 606 may reimburse the user's value-based account associated with the value-payment card. The associated user's value-based account may be the value-payment card account or a different account such as the user's bank account. For example, UBP system 606 may send to the bank that issued the value-payment card the amount (e.g., in a currency like the USD) charged by merchant system 610 to the user's value-based account.

Embodiments described with respect to FIGS. 1-6 may provide individual users the capability to hedge consumer products provided by merchants in real time and at a point of sale. In some embodiments, users are provided a stored-unit payment instrument (e.g., a digital wallet, mobile payment, or a physical payment card, etc.) that holds a representation of redeemable units of one or more products. By purchasing (or refilling) the redeemable units, the user may effectively lock in the price of those redeemable units at the purchase price at a point of sale with a merchant providing the redeemable products. The unit-based processor system describe in some embodiments are important to the implementation, processing, and creation of the stored-unit payment instrument and associated unit-based transactions. One skilled in the art would appreciate that without the described computer implementation of FIGS. 1-4, it would be extremely difficult to implement or to provide the stored-unit payment instrument to individual users. Some features of the UBP system are described below.

First, prices of financial instruments in financial markets and exchanges, often accessible via trading platforms, fluctuate constantly from millisecond to millisecond. Thus, the rapidly changing prices on trading platforms presents both a practical and a technical challenge for users because users cannot effectively operate the interfaces of the trading prices in real time. For example, in the time between the user stepping out of the vehicle and the time the user begins fueling the vehicle, the price of oil options may have changed hundreds of times. Also during this same period, the gasoline price at the gas station may remain constant. But, the gasoline prices at gas stations do not necessarily reflect prices of oil options on financial markets because, for example, time delays exist between oil prices on the financial markets and prices at the fueling station. Thus, the pricing of financial instruments (e.g., oil options) provided by trading platforms of exchanges also may not reflect the price presented at gas stations. Additionally, the length of these delays are inconsistent and constantly changing. The UBP system allows the user to purchase products at constant prices, even though underlying mechanisms employed to provide the stored-unit payment instrument and stored redeemable products are not constant.

Second, users cannot effectively replicate the functionality provided by the stored-unit payment instrument for redeeming units of products in real time at a point of sale at a merchant. For example, without the described technical implementation for providing the stored-unit payment instrument, every time the user wishes to refuel the vehicle at the gas station, the user may need to log into and simultaneously operate one or more trading platforms or brokerage accounts (because different brokerage accounts allow access to different exchanges) and determine which of the financial instruments to sell, which as described above also does not necessarily reflect the gasoline price presented at the merchant at the point of sale. This complexity and lack of a single interface increases user error and any potential benefits would be offset by the complexity, inefficiency, as well as the mismatch between the current gasoline price at the point of sale. Moreover, both the disparate interfaces and rapidly fluctuating prices present further practical and technical challenges for individual users to select financial instruments in real time that fits his or her refueling needs and behavior at a point of sale of the gasoline. The UBP system, through interactions with many systems, enables the user to access constant product prices with a simplified interface, without the user needing to engage in error-prone transactions, calculations, and coordination of numerous systems.

Third, the proper combination of instruments depends on information often inaccessible to the user. For example, the price of Exxon-Mobil® stock may be tied not only to the price of oil but also to the price of market indices, manufacturing indices, energy indices, and so forth. These indices, which may often be traded in the aggregate, and pull individual stock prices in one direction even though there may be no change to the underlying price of oil or the gas prices at the gas station. Additionally, domestic financial markets may only operate at certain hours of the day which mean the user would have little access to financial markets if he or she needs to refuel in the evening. By operating in the aggregate, the UBP system described in some embodiments provide individual users access to financial instruments beyond the constraint of regular financial market or exchange hours. Additionally, by querying various financial exchanges, the UBP system may determine and mitigate market forces that have little correlation with merchant prices.

Fourth, processing and managing stored-unit payment instruments and associated purchase and redeem requests require high data-transmission bandwidth and high computational capabilities of the UBP system. For example, even processing a single query for, e.g., a purchase request, requires sending and receiving of large amounts of data, and carrying out complex data analysis and calculations to properly construct an offering, comprised of one or more financial instruments, that is value stable and meets the user-specified requirements. Various embodiments describe computer techniques such as preprocessing queries, caching query results, and predicting query demands to reduce the data loads and spread the computational complexity across a greater time horizon.

Further, in some embodiment, though some computational transaction processes may be distributed to, for example, POS terminals, many of the unit-based transactions (and associated purchase or redeem requests) may need to be processed by and at a UBP system. But based on the limited network bandwidth to access financial markets and related exchanges, requesting a separate independent inquiry for each request to market exchanges for instrument pricing would overwhelm the networks of the various exchanges. This would result in unprocessed queries and require additional intense computer resources. To address the limited bandwidth of exchange networks, various embodiments herein describe aggregating the user requests (and associated queries) and broadcasting the results to various POS terminals. Through aggregation, the UBP system described above may exchange information and transactions with exchanges through current bandwidth-limited exchange communication networks at a fast enough rate such that UBP system may provide individual users real-time, point-of-sale access to redeem units of a product provided by merchants.

Figure 7:
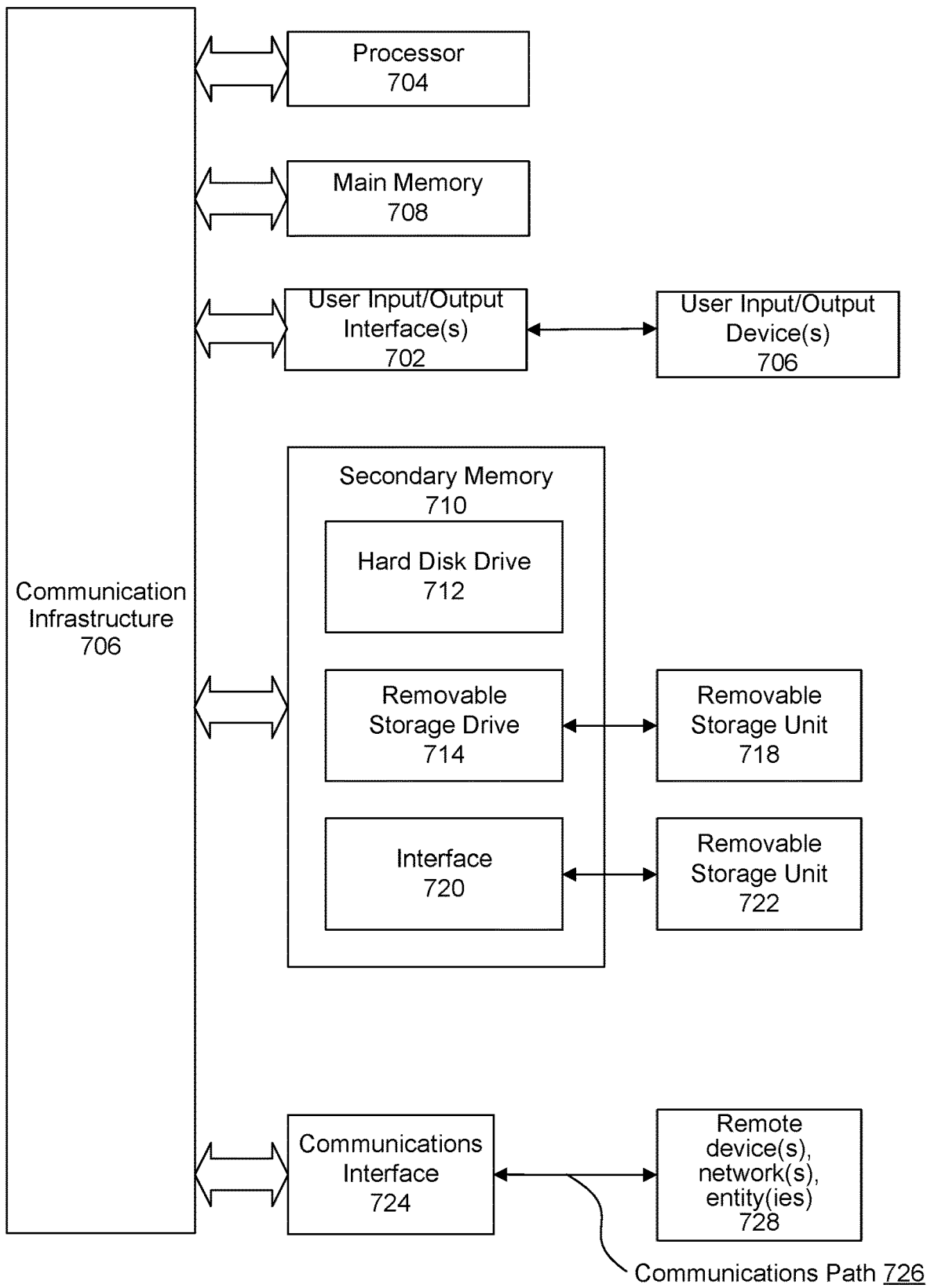
FIG. 7 is a diagram illustrating an example computing system, according to an embodiment.

Various embodiments, such as the servers and systems described with respect to FIGS. 1-2 can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein. In some cases, it should not be assumed that the illustrative examples contain only one preferred embodiment because the preferential aspect may change based on environment, circumstances, and constraints of a particular situation.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "some embodiments," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
  a data store that stores a user account associated with a stored-unit payment instrument issued to a user, the user account storing a representation of a first amount of a consumer product;
  at least one processor coupled to the data store;
  a monitoring component that when executing in the at least one processor:
    queries a financial exchange, via an exchange communication network, for a plurality of financial instruments that relate to the consumer product, and
    stores, in the data store, one or more financial instruments purchased from the queried plurality of financial instruments;
  an authorization component that when executing in the at least one processor:
    receives, from a point-of-sale (POS) terminal in a merchant system, via a communication network, a redeem request that specifies a second amount of the consumer product to be redeemed by the user in real time with the merchant system, and sends a message to the POS terminal, via the communication network, to approve the redeem request upon verifying that the first amount of the consumer product exceeds or meets the requested second amount, wherein the sent approval message causes the merchant system to dispense to the user the requested second amount of the consumer product; and an exchange component that when executing in the at least one processor:

based on the redeem request, places an order generated from one of the purchased one or more financial instruments, wherein the order is placed on the financial exchange via the exchange communication network.

2. The system of claim 1, wherein the authorization component further:

retrieves, from the data store, the user account and the associated second amount based on information stored on the stored-unit payment instrument and captured by the POS terminal;

receives, from the POS terminal, a message confirming that the POS terminal enabled the requested second amount of the consumer product to be dispensed; and responsive to receiving the confirmation message, decrements the first amount of the consumer product by the second amount within the representation of the user account.

3. The system of claim 1, wherein the placed order is one or more of exercising a call option, selling a call option, selling a future, selling an equity, or short covering an equity.

4. The system of claim 1, wherein the authorization component further:

receives, from the POS terminal, via the communication network, a second request that indicates the user wishes to redeem units of the consumer product, wherein the second request includes user account information stored on the stored-unit payment instrument and read by the POS terminal;

retrieves, from the data store, the user account and the associated second amount based on the user account information; and sends a second message to the POS terminal, via the communication network, to notify the POS terminal that the second amount of the consumer product is available for redeeming, causing the POS terminal to display the second amount to the user.

5. The system of claim 1, wherein the exchange component further:

aggregates the redeem request with a plurality of other received requests specifying respective amounts of the consumer product to redeem by aggregating the second amount with each of the respective amounts;

based on the aggregated requests, places the order generated from some of the purchased one or more financial instruments.

6. The system of claim 1, wherein the user is associated with the purchased one or more financial instruments, wherein the authorization component further receives, from a second POS terminal, a second request that indicates a second user wishes to purchase an option to redeem a third amount of the consumer product, and wherein the exchange component further reduces transactions with the financial exchange, via the exchange communication network, by performing a mutual transaction between the user and the second user by:

dissociating a portion of the purchased one or more financial instruments from the user, wherein the portion is based on a difference between the requested second amount to be redeemed and the third amount to be purchased; and associating the portion with the second user.

7. The system of claim 1, further comprising:

a device-information processing component that when executing in the at least one processor:

receives, from a device associated with the user, GPS information including a current GPS location or a series of GPS locations across a period of time, and using the received GPS information to predict that the redeem request will be received within a threshold period of time;

wherein the exchange component further:

based on the predicting, places the order generated from some of the purchased one or more financial instruments.

8. The system of claim 1, further comprising:

a device-information processing component that when executing in the at least one processor receives, from a device associated with the user, behavioral or biometric information captured by the device; and an authentication component that when executing in the at least one processor:

compares the received behavioral or biometric information with user information stored in the data store, and authenticates the redeem request based on the comparing;

wherein the authorization component further sends the approval request upon the verifying and the authenticating.

* * * * *